(12) United States Patent
Garvey et al.

(10) Patent No.: US 11,670,020 B2
(45) Date of Patent: *Jun. 6, 2023

(54) SEASONAL AWARE METHOD FOR FORECASTING AND CAPACITY PLANNING

(71) Applicant: Oracle International Corporation, Redwood Shores, CA (US)

(72) Inventors: Dustin Garvey, Oakland, CA (US); Uri Shaft, Fremont, CA (US); Edwina Ming-Yue Lu, Palo Alto, CA (US); Sampanna Shahaji Salunke, Dublin, CA (US); Lik Wong, Palo Alto, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/039,112

(22) Filed: Sep. 30, 2020

(65) Prior Publication Data

US 2021/0027504 A1 Jan. 28, 2021

Related U.S. Application Data

(63) Continuation of application No. 15/266,971, filed on Sep. 15, 2016, now Pat. No. 10,867,421.

(Continued)

(51) Int. Cl.
*G06Q 30/0202* (2023.01)
*G06Q 10/04* (2023.01)
(Continued)

(52) U.S. Cl.
CPC ........ *G06T 11/206* (2013.01); *G06F 11/3452* (2013.01); *G06F 17/18* (2013.01);
(Continued)

(58) Field of Classification Search
None
See application file for complete search history.

(56) References Cited

U.S. PATENT DOCUMENTS 5,448,476 A 9/1995 Kurokawa et al.
6,298,063 B1 10/2001 Coile et al.
(Continued)

FOREIGN PATENT DOCUMENTS

CN 1097829 A 1/1995
CN 101482944 A 7/2009
(Continued)

OTHER PUBLICATIONS

Herbst, "Self-adaptive workload classification and forecasting for proactive resource provisioning", 2014, ICPE'13, pp. 187-198 (Year: 2014).*

(Continued)

*Primary Examiner* — Ivan R Goldberg
(74) *Attorney, Agent, or Firm* — Invoke

(57) ABSTRACT

Techniques are described for generating seasonal forecasts. According to an embodiment, a set of time-series data is associated with one or more classes, which may include a first class that represent a dense pattern that repeats over multiple instances of a season in the set of time-series data and a second class that represent another pattern that repeats over multiple instances of the season in the set of time-series data. A particular class of data is associated with at least two sub-classes of data, where a first sub-class represents high data points from the first class, and a second sub-class represents another set of data points from the first class. A trend rate is determined for a particular sub-class. Based at least in part on the trend rate, a forecast is generated.

19 Claims, 9 Drawing Sheets

Related U.S. Application Data

(60) Provisional application No. 62/301,590, filed on Feb. 29, 2016, provisional application No. 62/301,585, filed on Feb. 29, 2016.

(51) Int. Cl.

| | | |
|---|---|---|
| *G06Q 10/0631* | (2023.01) | |
| *G06T 11/20* | (2006.01) | |
| *G06N 20/00* | (2019.01) | |
| *G06F 17/18* | (2006.01) | |
| *G06F 21/55* | (2013.01) | |
| *G06Q 10/06* | (2023.01) | |
| *G06F 11/34* | (2006.01) | |
| *G06F 18/2431* | (2023.01) | |
| *G06Q 10/1093* | (2023.01) | |
| *G06T 11/00* | (2006.01) | |
| *H04L 41/0896* | (2022.01) | |
| *G06F 9/50* | (2006.01) | |

(52) U.S. Cl.
CPC .......... *G06F 18/2431* (2023.01); *G06F 21/55* (2013.01); *G06N 20/00* (2019.01); *G06Q 10/04* (2013.01); *G06Q 10/06* (2013.01); *G06Q 10/0631* (2013.01); *G06Q 10/1093* (2013.01); *G06Q 30/0202* (2013.01); *G06T 11/001* (2013.01); *G06F 9/505* (2013.01); *G06F 2218/12* (2023.01); *G06Q 10/06315* (2013.01); *H04L 41/0896* (2013.01)

(56) References Cited

U.S. PATENT DOCUMENTS

| | | |
|---|---|---|
| 6,438,592 B1 | 8/2002 | Killian |
| 6,597,777 B1 | 7/2003 | Ho |
| 6,643,613 B2 | 11/2003 | McGee et al. |
| 6,928,398 B1 | 8/2005 | Fang et al. |
| 6,996,599 B1 | 2/2006 | Anders et al. |
| 7,343,375 B1 | 3/2008 | Dulac |
| 7,529,991 B2 | 5/2009 | Ide et al. |
| 7,672,814 B1 | 3/2010 | Raanan et al. |
| 7,739,143 B1 | 6/2010 | Dwarakanath et al. |
| 7,739,284 B2 | 6/2010 | Aggarwal et al. |
| 7,783,510 B1 | 8/2010 | Gilgur et al. |
| 7,987,106 B1 | 7/2011 | Aykin |
| 8,014,983 B2 | 9/2011 | Crowe et al. |
| 8,200,454 B2 | 6/2012 | Dorneich et al. |
| 8,229,876 B2 | 7/2012 | Roychowdhury |
| 8,234,236 B2 | 7/2012 | Beaty et al. |
| 8,363,961 B1 | 1/2013 | Avidan et al. |
| 8,576,964 B2 | 11/2013 | Taniguchi et al. |
| 8,583,649 B2 | 11/2013 | Ailon et al. |
| 8,635,328 B2 | 1/2014 | Corley et al. |
| 8,650,299 B1 | 2/2014 | Huang et al. |
| 8,676,964 B2 | 3/2014 | Gopalan et al. |
| 8,694,969 B2 | 4/2014 | Bernardini et al. |
| 8,776,066 B2 | 7/2014 | Krishnamurthy et al. |
| 8,880,525 B2 | 11/2014 | Galle et al. |
| 8,930,757 B2 | 1/2015 | Nakagawa |
| 8,949,677 B1 | 2/2015 | Brundage et al. |
| 9,002,774 B2 | 4/2015 | Karlsson |
| 9,053,171 B2 | 6/2015 | Ailon et al. |
| 9,141,914 B2 | 9/2015 | Viswanathan et al. |
| 9,147,167 B2 | 9/2015 | Urmanov et al. |
| 9,195,563 B2 | 11/2015 | Scarpelli |
| 9,218,232 B2 | 12/2015 | Khalastchi et al. |
| 9,292,408 B2 | 3/2016 | Bernstein et al. |
| 9,323,599 B1 | 4/2016 | Iyer et al. |
| 9,323,837 B2 | 4/2016 | Zhao et al. |
| 9,330,119 B2 | 5/2016 | Chan et al. |
| 9,355,357 B2 | 5/2016 | Hao et al. |
| 9,367,382 B2 | 6/2016 | Yabuki |
| 9,389,946 B2 | 7/2016 | Higuchi |
| 9,471,778 B1 | 10/2016 | Seo et al. |
| 9,495,220 B2 | 11/2016 | Talyansky |
| 9,495,395 B2 | 11/2016 | Chan et al. |
| 9,507,718 B2 | 11/2016 | Rash et al. |
| 9,514,213 B2 | 12/2016 | Wood et al. |
| 9,529,630 B1 | 12/2016 | Fakhouri et al. |
| 9,658,910 B2 | 5/2017 | Poola et al. |
| 9,658,916 B2 | 5/2017 | Yoshinaga et al. |
| 9,692,662 B2 | 6/2017 | Chan et al. |
| 9,710,493 B2 | 7/2017 | Wang et al. |
| 9,727,533 B2 | 8/2017 | Thibaux |
| 9,740,402 B2 | 8/2017 | Manoharan et al. |
| 9,779,361 B2 | 10/2017 | Jones et al. |
| 9,811,394 B1 | 11/2017 | Kogias et al. |
| 9,961,571 B2 | 5/2018 | Yang et al. |
| 10,073,906 B2 | 9/2018 | Lu et al. |
| 10,127,695 B2 | 11/2018 | Garvey et al. |
| 10,210,036 B2 | 2/2019 | Iyer et al. |
| 10,331,802 B2 | 6/2019 | Garvey et al. |
| 10,692,255 B2 | 6/2020 | Garvey et al. |
| 10,699,211 B2 | 6/2020 | Garvey et al. |
| 10,885,461 B2 | 1/2021 | Garvey et al. |
| 10,915,830 B2 | 2/2021 | Garvey et al. |
| 11,295,217 B2 | 4/2022 | Herzog |
| 2002/0019860 A1 | 2/2002 | Lee et al. |
| 2002/0092004 A1 | 7/2002 | Lee et al. |
| 2002/0183972 A1 | 12/2002 | Enck et al. |
| 2002/0188650 A1 | 12/2002 | Sun et al. |
| 2003/0149603 A1 | 8/2003 | Ferguson et al. |
| 2003/0154044 A1 | 8/2003 | Lundstedt et al. |
| 2003/0224344 A1 | 12/2003 | Shamir et al. |
| 2004/0088406 A1 | 5/2004 | Corley et al. |
| 2005/0119982 A1 | 6/2005 | Ito et al. |
| 2005/0132030 A1 | 6/2005 | Hopen et al. |
| 2005/0159927 A1 | 7/2005 | Cruz et al. |
| 2005/0193281 A1 | 9/2005 | Ide et al. |
| 2006/0065717 A1 | 3/2006 | Hurwitz et al. |
| 2006/0087962 A1 | 4/2006 | Golia et al. |
| 2006/0106743 A1 | 5/2006 | Horvitz |
| 2006/0106797 A1 | 5/2006 | Srinivasa et al. |
| 2006/0161485 A1 | 7/2006 | Meldahl |
| 2006/0212593 A1 | 9/2006 | Patrick et al. |
| 2006/0287848 A1 | 12/2006 | Li et al. |
| 2007/0011281 A1 | 1/2007 | Jhoney et al. |
| 2007/0150329 A1 | 6/2007 | Brook et al. |
| 2007/0179836 A1 | 8/2007 | Juang et al. |
| 2008/0221974 A1 | 9/2008 | Gilgur et al. |
| 2008/0288089 A1 | 11/2008 | Pettus et al. |
| 2009/0024427 A1 | 1/2009 | Shan |
| 2009/0030752 A1 | 1/2009 | Senturk-Doganaksoy et al. |
| 2010/0027552 A1 | 2/2010 | Hill |
| 2010/0036857 A1 | 2/2010 | Marvasti et al. |
| 2010/0050023 A1 | 2/2010 | Scarpelli et al. |
| 2010/0082132 A1 | 4/2010 | Marruchella et al. |
| 2010/0082697 A1 | 4/2010 | Gupta et al. |
| 2010/0185499 A1 | 7/2010 | Dwarakanath et al. |
| 2010/0257026 A1* | 10/2010 | Brocklebank ...... G06Q 10/0639 705/7.31 |
| 2010/0257133 A1 | 10/2010 | Crowe et al. |
| 2010/0324869 A1 | 12/2010 | Cherkasova et al. |
| 2011/0022879 A1 | 1/2011 | Chavda et al. |
| 2011/0040575 A1 | 2/2011 | Wright et al. |
| 2011/0125894 A1 | 5/2011 | Anderson et al. |
| 2011/0126197 A1 | 5/2011 | Larsen et al. |
| 2011/0126275 A1 | 5/2011 | Anderson et al. |
| 2011/0213788 A1 | 9/2011 | Zhao et al. |
| 2011/0265164 A1 | 10/2011 | Lucovsky et al. |
| 2012/0005359 A1 | 1/2012 | Seago et al. |
| 2012/0051369 A1 | 3/2012 | Bryan et al. |
| 2012/0066389 A1 | 3/2012 | Hegde et al. |
| 2012/0110462 A1 | 5/2012 | Eswaran et al. |
| 2012/0110583 A1 | 5/2012 | Balko et al. |
| 2012/0203823 A1 | 8/2012 | Manglik et al. |
| 2012/0240072 A1 | 9/2012 | Altamura et al. |
| 2012/0254183 A1 | 10/2012 | Ailon et al. |
| 2012/0265881 A1 | 10/2012 | Chen et al. |
| 2012/0278477 A1* | 11/2012 | Terrell .................. H04L 69/22 709/224 |
| 2012/0278663 A1 | 11/2012 | Hasegawa |

(56) References Cited

U.S. PATENT DOCUMENTS

| | | |
|---|---|---|
| 2012/0296696 A1 | 11/2012 | Cantor et al. |
| 2012/0323988 A1 | 12/2012 | Barzel et al. |
| 2013/0013535 A1 | 1/2013 | Punera et al. |
| 2013/0024173 A1 | 1/2013 | Brzezicki et al. |
| 2013/0080374 A1 | 3/2013 | Karlsson |
| 2013/0151179 A1 | 6/2013 | Gray |
| 2013/0226320 A1 | 8/2013 | Berg-Sonne et al. |
| 2013/0282891 A1 | 10/2013 | Davis et al. |
| 2013/0326202 A1 | 12/2013 | Rosenthal et al. |
| 2013/0329981 A1 | 12/2013 | Hiroike |
| 2014/0058572 A1 | 2/2014 | Stein et al. |
| 2014/0067757 A1 | 3/2014 | Ailon et al. |
| 2014/0095422 A1* | 4/2014 | Solomon ............... G06N 5/02 706/46 |
| 2014/0101119 A1 | 4/2014 | Li et al. |
| 2014/0101300 A1 | 4/2014 | Rosensweig et al. |
| 2014/0215470 A1 | 7/2014 | Iniguez |
| 2014/0310235 A1 | 10/2014 | Chan et al. |
| 2014/0310714 A1 | 10/2014 | Chan et al. |
| 2014/0325649 A1 | 10/2014 | Zhang |
| 2014/0379717 A1 | 12/2014 | Urmanov et al. |
| 2015/0032775 A1 | 1/2015 | Yang et al. |
| 2015/0033084 A1 | 1/2015 | Sasturkar et al. |
| 2015/0040142 A1 | 2/2015 | Cheetancheri et al. |
| 2015/0046123 A1 | 2/2015 | Kato |
| 2015/0046920 A1 | 2/2015 | Allen |
| 2015/0065121 A1 | 3/2015 | Gupta et al. |
| 2015/0180734 A1 | 6/2015 | Maes et al. |
| 2015/0205691 A1 | 7/2015 | Seto |
| 2015/0234869 A1 | 8/2015 | Chan et al. |
| 2015/0242243 A1 | 8/2015 | Balakrishnan et al. |
| 2015/0244597 A1 | 8/2015 | Maes et al. |
| 2015/0248446 A1 | 9/2015 | Nordstrom et al. |
| 2015/0251074 A1 | 9/2015 | Ahmed et al. |
| 2015/0296030 A1 | 10/2015 | Maes et al. |
| 2015/0302318 A1 | 10/2015 | Chen et al. |
| 2015/0312274 A1 | 10/2015 | Bishop et al. |
| 2015/0317589 A1 | 11/2015 | Anderson et al. |
| 2015/0371144 A1 | 12/2015 | Engle |
| 2016/0034328 A1 | 2/2016 | Poola et al. |
| 2016/0042289 A1 | 2/2016 | Poola et al. |
| 2016/0062950 A1 | 3/2016 | Brodersen et al. |
| 2016/0071517 A1 | 3/2016 | Beaver et al. |
| 2016/0092516 A1 | 3/2016 | Poola et al. |
| 2016/0105327 A9 | 4/2016 | Cremonesi et al. |
| 2016/0139964 A1 | 5/2016 | Chen et al. |
| 2016/0171037 A1 | 6/2016 | Mathur et al. |
| 2016/0253381 A1 | 9/2016 | Kim et al. |
| 2016/0283533 A1 | 9/2016 | Urmanov et al. |
| 2016/0292611 A1 | 10/2016 | Boe et al. |
| 2016/0294773 A1 | 10/2016 | Yu et al. |
| 2016/0299938 A1 | 10/2016 | Malhotra et al. |
| 2016/0299961 A1 | 10/2016 | Olsen |
| 2016/0321588 A1 | 11/2016 | Das et al. |
| 2016/0342909 A1 | 11/2016 | Chu et al. |
| 2016/0357674 A1 | 12/2016 | Waldspurger et al. |
| 2016/0378809 A1 | 12/2016 | Chen et al. |
| 2017/0061297 A1 | 3/2017 | Joshi et al. |
| 2017/0061321 A1 | 3/2017 | Maiya et al. |
| 2017/0249563 A1 | 8/2017 | Garvey et al. |
| 2017/0249564 A1 | 8/2017 | Garvey et al. |
| 2017/0249648 A1 | 8/2017 | Garvey et al. |
| 2017/0249649 A1 | 8/2017 | Garvey et al. |
| 2017/0249763 A1 | 8/2017 | Garvey et al. |
| 2017/0262223 A1 | 9/2017 | Dalmatov et al. |
| 2017/0284903 A1 | 10/2017 | Anderson et al. |
| 2017/0329660 A1 | 11/2017 | Salunke et al. |
| 2017/0351563 A1 | 12/2017 | Miki et al. |
| 2017/0364851 A1 | 12/2017 | Maheshwari et al. |
| 2018/0026907 A1 | 1/2018 | Miller et al. |
| 2018/0039555 A1 | 2/2018 | Salunke et al. |
| 2018/0052804 A1 | 2/2018 | Mikami et al. |
| 2018/0053207 A1 | 2/2018 | Modani et al. |
| 2018/0059628 A1 | 3/2018 | Yoshida |
| 2018/0081629 A1 | 3/2018 | Kuhhirte et al. |
| 2018/0219889 A1 | 8/2018 | Oliner et al. |
| 2018/0268152 A1 | 9/2018 | Cuomo et al. |
| 2018/0321989 A1 | 11/2018 | Shetty et al. |
| 2018/0324199 A1 | 11/2018 | Crotinger et al. |
| 2018/0330433 A1 | 11/2018 | Frenzel et al. |
| 2018/0349797 A1 | 12/2018 | Garvey et al. |
| 2018/0351786 A1 | 12/2018 | Pope et al. |
| 2019/0042982 A1 | 2/2019 | Qu et al. |
| 2019/0065275 A1 | 2/2019 | Wong et al. |
| 2019/0305876 A1 | 10/2019 | Sundaresan et al. |
| 2020/0034745 A1 | 1/2020 | Nagpal et al. |
| 2020/0125988 A1 | 4/2020 | Garvey et al. |
| 2021/0257060 A1 | 8/2021 | Curtis et al. |

FOREIGN PATENT DOCUMENTS

| | | |
|---|---|---|
| CN | 103984938 A | 8/2014 |
| CN | 105144112 A | 12/2015 |
| CN | 105426411 A | 3/2016 |
| CN | 109359763 A | 2/2019 |
| JP | 2006-129446 A | 5/2006 |
| WO | 2011/071624 A2 | 6/2011 |
| WO | 2013/016584 A1 | 1/2013 |

OTHER PUBLICATIONS

Carvalho et al., "Long-term SLOs for reclaimed cloud computing resources," 2014, In Proceedings of the ACM Symposium on Cloud Computing (SOCC '14). Association for Computing Machinery, New York, NY, USA, 1-13 (Year: 2014).*

Ghosh, "Biting off safely more than you can chew: Predictive analytics for resource over-commit in iaas cloud," 2012, In 2012 IEEE Fifth International Conference on Cloud Computing, pp. 25-32 (Year: 2012).*

Rasheed, "Framework for Periodic Outlier Pattern Detection in Time-Series Sequences," 2014, IEEE Transactions on Cybernetics, vol. 44, No. 5, pp. 569-582 (Year: 2014).*

Laptev, "Generic and scalable framework for automated time-series anomaly detection," 2015, In Proceedings of the 21th ACM SIGKDD international conference on knowledge discovery and data mining, pp. 1939-1947 (Year: 2015).*

"OpenStack Compute Administration Manual", Mar. 1, 2011 (Mar. 1, 2011), XP055207492, Retrieved from the Internet: URL:http://web.archive.org/web/20110708071910/http://docs.openstack.org/bexar/openstack-compute/admin/os-compute-admin-book-bexar.pdf [retrieved on Aug. 12, 2015].

"OpenStack Object Storage Administrator Manual", Jun. 2, 2011 (Jun. 2, 2011), XP055207490, Retrieved from the Internet: URL:http://web.archive.org/web/20110727190919/http://docs.openstack.org/cactus/openstack-object-storage/admin/os-objectstorage-adminguide-cactus.pdf [retrieved on Aug. 12, 2015].

"Time Series Pattern Search: A tool to extract events from time series data", available online at <https://www.ceadar.ie/pages/time-series-pattern-search/>, retrieved on Apr. 24, 2020, 4 pages.

Ahmed, Reservoir-based network traffic stream summarization for anomaly detection, Article in Pattern Analysis and Applications, Oct. 2017.

Alberto Zuin: "OpenNebula Setting up High Availability in OpenNebula with LVM", May 2, 2011 (May 2, 2011), XP055207701, Retrieved from the Internet: URL:http://opennebula.org/setting-up-highavailability-in-opennebula-with-lvm/ [retrieved on Aug. 13, 2015] p. 1.

Andrew Beekhof: "Clusters from Scratch—Apache, DRBD and GFS2 Creating Active/Passive and Active/Active Clusters on Fedora 12", Mar. 11, 2010 (Mar. 11, 2010), XP055207651, Retrieved from the Internet: URL:http://clusterlabs.org/doc/en-US/Pacemaker/1.0/pdf/Clusters from Scratch/Pacemaker-1.0-Clusters from Scratch-en-US.pdi [retrieved on Aug. 13, 2015].

Anonymous: "High Availability for the Ubuntu Enterprise Cloud (UEC)—Cloud Controller (CLC)", Feb. 19, 2011 (Feb. 19, 2011), XP055207708, Retrieved from the Internet: URL:http://blog.csdn.net/superxgl/article/details/6194473 [retrieved on Aug. 13, 2015] p. 1.

(56) References Cited

OTHER PUBLICATIONS

Charapko, Gorilla—Facebook's Cache for Time Series Data, http://charap.co/gorilla-facebooks-cache-for-monitoring-data/, Jan. 11, 2017.
Chris Bunch et al: "AppScale: Open-Source Platform As-A-Service", Jan. 1, 2011 (Jan. 1, 2011), XP055207440, Retrieved from the Internet: URL:http://128.111.41.26/research/tech reports/reports/2011-01 .pdf [retrieved on Aug. 12, 2015] pp. 2-6.
Davies, David L., et al., "A Cluster Separation measure", IEEE Transactions on Pattern Analysis and Machine Intelligence, vol. PAMI-1, No. 2, Apr. 1979, pp. 224-227.
Dunning et al., Computing Extremely Accurate Quantiles Using t-DIGESTS.
Faraz Rasheed, "A Framework for Periodic Outlier Pattern Detection in Time-Series Sequences," May 2014, IEEE.
Greenwald et al. "Space-efficient online computation of quantile summaries." ACM Proceedings of the 2001 SIGMOD international conference on Management of data pp. 58-66.
Greunen, "Forecasting Methods for Cloud Hosted Resources, a comparison," 2015, 11th International Conference on Network and Service Management (CNSM), pp. 29-35 (Year: 2015).
Gueyoung Jung et al: "Performance and availability aware regeneration for cloud based multitier applications", Dependable Systems and Networks (DSN), 2010 IEEE/IFIP International Conference on, IEEE, Piscataway, NJ, USA, Jun. 28, 2010 (Jun. 28, 2010), pp. 497-506.
Gunter et al., Log Summarization and Anomaly Detection for Troubleshooting Distributed Systems, Conference: 8th IEEE/ACM International Conference on Grid Computing (GRID 2007), Sep. 19-21, 2007, Austin, Texas, USA, Proceedings.
Hao et al., Visual Analytics of Anomaly Detection in Large Data Streams, Proc. SPIE 7243, Visualization and Data Analysis 2009, 10 pages.
Haugen et al., "Extracting Common Time Trends from Concurrent Time Series: Maximum Autocorrelation Factors with Applications", Stanford University, Oct. 20, 2015, pp. 1-38.
Jain and Chlamtac, P-Square Algorithm for Dynamic Calculation of Quantiles and Histograms Without Storing Observations, ACM, Oct. 1985 (10 pages).
Jarvis, R. A., et al., "Clustering Using a Similarity Measure Based on Shared Neighbors", IEEE Transactions on Computers, vol. C-22, No. 11, Nov. 1973, pp. 1025-1034.
Lin, Xuemin, et al. "Continuously maintaining quantile summaries of the most recent n elements over a data stream," IEEE, 2004.
Niino, Junichi, "Open Source Cloud Infrastructure 'OpenStack', its History and Scheme", Available online at <http://www.publickey1.jp/blog/11/openstack_1.html>, Jun. 13, 2011, 8 pages (Japanese Language Copy Only) (See Communication under 37 CFR .Sctn 1.98 (3)).
NPL: Web document dated Feb. 3, 2011, Title: OpenStack Compute, Admin Manual.
Nurmi D et al: "The Eucalyptus Open-Source Cloud-Computing System", Cluster Computing and the Grid, 2009. CCGRID '09. 9th IEEE/ACM International Symposium on, IEEE, Piscataway, NJ, USA, May 18, 2009 (May 18, 2009), pp. 124-131.
Qiu, Hai, et al. "Anomaly detection using data clustering and neural networks." Neural Networks, 2008. IJCNN 2008.(IEEE World Congress on Computational Intelligence). IEEE International Joint Conference on. IEEE, 2008.
Slipetskyy, Rostyslav, "Security Issues in OpenStack", Masters Thesis, Technical University of Denmark, Jun. 2011, p. 7 (entire document especially abstract).
Somlo, Gabriel, et al., "Incremental Clustering for Profile Maintenance in Information Gathering Web Agents", Agents '01, Montreal, Quebec, Canada, May 28-Jun. 1, 2001, pp. 262-269.
Suntinger, "Trend-based similarity search in time-series data," 2010, Second International Conference on Advances in Databases, Knowledge, and Data Applications, IEEE, pp. 97-106 (Year: 2010).
Szmit et al., "Usage of Modified Holt-Winters Method in the Anomaly Detection of Network Traffic: Case Studies", Journal of Computer Networks and Communications, vol. 2012, Article ID 192913, Mar. 29, 2012, pp. 1-5.
Taylor et al., "Forecasting Intraday Time Series With Multiple Seasonal Cycles Using Parsimonious Seasonal Exponential Smoothing", Omega, vol. 40, No. 6, Dec. 2012, pp. 748-757.
Voras et al., "Criteria for Evaluation of Open Source Cloud Computing Solutions", Proceedings of the ITI 2011 33rd international Conference on Information Technology Interfaces (ITI), US, IEEE, Jun. 27-30, 2011, 6 pages.
Voras I et al: "Evaluating open-source cloud computing solutions", MIPRO, 2011 Proceedings of the 34th International Convention, IEEE, May 23, 2011 (May 23, 2011), pp. 209-214.
Wilks, Samuel S. "Determination of sample sizes for setting tolerance limits," The Annals of Mathematical Statistics 12.1 (1941): 91-96.
Willy Tarreau: "HAProxy Architecture Guide", May 25, 2008 (May 25, 2008), XP055207566, Retrieved from the Internet: URL:http://www.haproxy.org/download/1.2/doc/architecture.txt [retrieved on Aug. 13, 2015].
Yin, "System resource utilization analysis and prediction for cloud based applications under bursty workloads," 2014, Information Sciences, vol. 279, pp. 338-357 (Year: 2014).
Yokoyama, Tetsuya, "Windows Server 2008, Certification Test, Part 5: Reliability", Apr. 15, 2008, pp. 124-125 along with 4 pages of English Translation.
Lehmann, "Variability of Atmospheric Circulation Patterns Associated With Large Volume Changes of the Baltic Sea", Adv. Sci. Res., 12, 219-225, 2015, www.adv-sci-res.net/12/219/2015/DOI:10.5.194/ASR-12-219-2015 (Year: 2015).
Toreti, "A Novel Approach for the Detection of Inhomogeneities Affecting Climate Time Series", Journal of Applied Meteorology and Climatology, vol. 51, Feb. 2012, DOI: 10.1175/JAMC-D-10-05033.1 (Year: 2012).
Zhai, "Spatial Variation and Trends in PDSI and SPI Indices and Their Relation to Streamflow in 10 Large Regions of China", 2010, Journal of Climate, vol. 23, 2010 American Meteorological Society, DOI: 10.1175/2009JCLI2968.1 (Year: 2010).
Li et al., "Forecasting Web Page Views: Methods and Observations," in 9 J. Machine Learning Res. 2217-50 (2008). (Year: 2008).
Guajardo, et al., "A model updating strategy for predicting time series with seasonal patterns"Applied Soft Computing, vol. 10 No. 1, 2010, pp. 276-283.
Chu, "A Piecewise Linear Approach to Modeling and Forecasting Demand for Macau Tourism," in 32 Tourism Mgmt. 1414-20 (2011). (Year: 2011).
Esling et al., "Time-Series Data Mining," in 45.1 ACM Computing Surveys 1-34 (2012). (Year: 2012).
Wang, "Online Monitoring and Prediction of Complex Time Series Events from Nonstationary Time Series Data," doctoral dissertation, Rutgers U. (2012). (Year: 2012).
Kuhn, Markus, A summary of the international standard date and time notation (https://www.cl.cam.ac.uk/~mgk25/iso-time.html), date retrieved from web.archive.org Oct. 13, 2018, 5 pages (Year 2018).
Morgan, Derek P., Chapter 4: ISO 8601 Dates, Times, Datetimes, Durations, and Functions, The Essential Guide to SAS Dates and Times, Second Edition, Dec. 2014, 40 pages (Year: 2014).

\* cited by examiner

SEASONAL AWARE METHOD FOR FORECASTING AND CAPACITY PLANNING

INCORPORATION BY REFERENCE; DISCLAIMER

Each of the following applications are hereby incorporated by reference: application Ser. No. 15/266,971, filed on Sep. 15, 2016; application No. 62/301,590, filed Feb. 29, 2016; Application No. 62/301,585, filed Feb. 29, 2016. The Applicant hereby rescinds any disclaimer of claim scope in the parent application(s) or the prosecution history thereof and advises the USPTO that the claims in this application may be broader than any claim in the parent application(s).

RELATED APPLICATIONS

This application is related to U.S. application Ser. No. 15/140,358, entitled "SCALABLE TRI-POINT ARBITRATION AND CLUSTERING"; U.S. application Ser. No. 15/057,065, entitled "SYSTEM FOR DETECTING AND CHARACTERIZING SEASONS"; U.S. application Ser. No. 15/057,060, entitled "SUPERVISED METHOD FOR CLASSIFYING SEASONAL PATTERNS"; U.S. application Ser. No. 15/057,062, entitled "UNSUPERVISED METHOD FOR CLASSIFYING SEASONAL PATTERNS", and U.S. application Ser. No. 15/266,979, entitled "SYSTEMS AND METHODS FOR DETECTING AND ACCOMMODATING STATE CHANGES IN MODELLING", the entire contents for each of which are incorporated by reference herein as if set forth in their entirety.

TECHNICAL FIELD

The present disclosure relates to computer-implemented techniques for generating forecasts. In particular, the present disclosure relates to trending different patterns within a time-series to project future values.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A time series is a sequence of data points that are typically obtained by capturing measurements from one or more sources over a period of time. As an example, businesses may collect, continuously or over a predetermined time interval, various performance metrics for software and hardware resources that are deployed within a datacenter environment. Analysts frequently apply forecasting models to time series data in an attempt to predict future events based on observed measurements. One such model is the Holt-Winters forecasting algorithm, also referred to as triple exponential smoothing.

The Holt-Winters forecasting algorithm takes into account both trends and seasonality in the time series data in order to formulate a prediction about future values. A trend in this context refers to the tendency of the time series data to increase or decrease over time, and seasonality refers to the tendency of time series data to exhibit behavior that periodically repeats itself. A season generally refers to the period of time before an exhibited behavior begins to repeat itself. The additive seasonal model is given by the following formulas:

$$L_t = \alpha(X_t - S_{t-p}) + (1-\alpha)(L_{t-1} + T_{t-1}) \quad (1)$$

$$T_t = \gamma(L_t - L_{t-1}) + (1-\gamma)T_{t-1} \quad (2)$$

$$S_t = \delta(X_t - L_t) + (1-\delta)S_{t-p} \quad (3)$$

where $X_t$, $L_t$, $T_t$, and $S_t$ denote the observed level, local mean level, trend, and seasonal index at time t, respectively. Parameters $\alpha$, $\gamma$, $\delta$ denote smoothing parameters for updating the mean level, trend, and seasonal index, respectively, and p denotes the duration of the seasonal pattern. The forecast is given as follows:

$$F_{t+k} = L_t + kT_t + S_{t+k-p} \quad (4)$$

where $F_{t+k}$ denotes the forecast at future time t+k.

The additive seasonal model is typically applied when seasonal fluctuations are independent of the overall level of the time series data. An alternative, referred to as the multiplicative model, is often applied if the size of seasonal fluctuations vary based on the overall level of the time series data. The multiplicative model is given by the following formulas:

$$L_t = \alpha(X_t/S_{t-p}) + (1-\alpha)(L_{t-1} + T_{t-1}) \quad (5)$$

$$T_t = \gamma(L_t - L_{t-1}) + (1-\gamma)T_{t-1} \quad (6)$$

$$S_t = \delta(X_t/L_t) + (1-\delta)S_{t-p} \quad (7)$$

where, as before, $X_t$, $L_t$, $T_t$, and $S_t$ denote the observed level, local mean level, trend, and seasonal index at time t, respectively. The forecast is then given by the following formula:

$$F_{t+k} = (L_t + kT_t)S_{t+k-p} \quad (8)$$

The additive and multiplicative Holt-Winters forecasting models remove sparse components from a time-series signal when generating projections of future values. While this approach mitigates the impacts of noise in the resulting forecasts, it may cause meaningful sparse seasonal patterns to be overlooked. For example, if a time series is biased toward minimal activity, then significant seasonal highs may be smoothed out of the generated forecast. As a result, the projected highs may be underestimated, negatively impacting the accuracy of the forecast.

BRIEF DESCRIPTION OF THE DRAWINGS

Various embodiments are illustrated by way of example, and not by way of limitation, in the figures of the accompanying drawings and in which like reference numerals refer to similar elements and in which.

DETAILED DESCRIPTION

Figure 1:
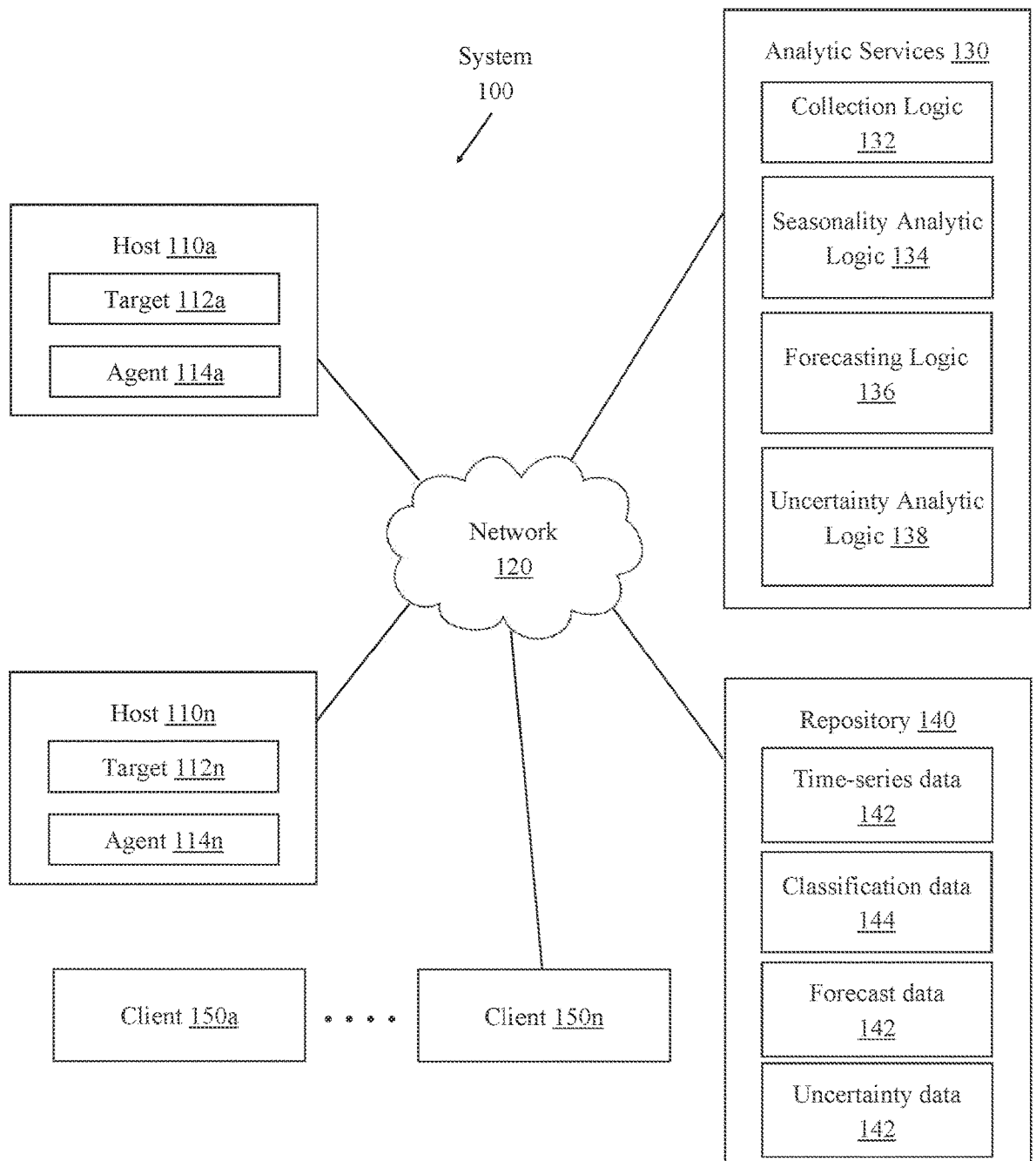
FIG. 1 illustrates an example system for generating forecasts based on seasonal analytics.

In the following description, for the purposes of explanation, numerous specific details are set forth in order to provide a thorough understanding of the disclosure. It will be apparent, however, that the present invention may be practiced without these specific details. In other instances, structures and devices are shown in block diagram form in order to avoid unnecessarily obscuring the present invention.

General Overview

In various embodiments, computer systems, stored instructions, and technical steps are described for forecasting and capacity planning. Seasonal patterns may be detected by analyzing data points collected across different seasonal periods (also referred to herein as "samples") within the time series. If a seasonal pattern is detected, then the data points are further analyzed to classify the seasonal pattern. For instance, the data points may be split into two separate classes: a first class that is a dense signal of data points that represent a dense pattern that repeats over multiple instances of a season in the set of time-series data the second class is a signal of data points that represent another pattern that repeats over multiple instances of the season in the set of time-series data. The sparse and/or dense signal may further be split into two or more sub-classes of data. For instance, a sub-class may be defined for sparse highs, sparse lows, dense highs, dense lows, etc. Based on the classifications, a forecast may be generated, where the forecast identifies projected future values for the time series. The forecast may be displayed, stored, or otherwise output to expose forecasted values of a time series to an end user or application.

In some embodiments, forecasts are generated to account for seasonal pattern classifications. When generating a forecast, the time series is decomposed into a set of signals by seasonal class. For each seasonal class, a trend and anchor point are determined from the corresponding signal. The forecasted value for a given sample of time may then be generated based on the trend and anchor point for the seasonal class with which the sample of time is associated. This approach allows for multiple trend lines to be inferred from the same set of time series data. Forecasting may be performed at a more granular level based on how seasonal patterns within the time series are classified.

In some embodiments, uncertainty intervals are generated based on seasonal pattern classifications. A set of forecast residual samples may be computed and chunked based on seasonal class. For instance, forecast residuals for sparse highs may be computed and stored separately from forecast residuals for dense high, not high, and other seasonal classes. The forecast residuals may then be used to compute a tolerance interval for different projected values depending on the seasonal class with which the projected value is associated. This allows the uncertainty of a projected value to be calculated from residual samples that are chunked by context.

Time Series Data Sources

A time series comprises a collection of data points that captures information over time. The source of the time series data and the type of information that is captured may vary from implementation to implementation. For example, a time series may be collected from one or more software and/or hardware resources and capture various performance attributes of the resources from which the data was collected. As another example, a time series may be collected using one or more sensors that measure physical properties, such as temperature, pressure, motion, traffic flow, or other attributes of an object or environment.

Time series data may be collected from a single source or multiple sources. Referring to FIG. 1, for instance, it illustrates example system 100 for detecting and characterizing seasonal patterns within time series data. System 100 includes hosts 110a to 110n, network 120, analytic services 130, repository 140, and clients 150a to 150n. Components of system 100 may be implemented in one or more host machines operating within one or more clouds or other networked environments, depending on the particular implementation.

Hosts 110a to 110n represent a set of one or more network hosts and generally comprise targets 112a to 112n and agents 114a to 114n. A "target" in this context refers to a source of time series data. For example, a target may be a software deployment such as a database server instance, executing middleware, or some other application executing on a network host. As another example, a target may be a sensor that monitors a hardware resource or some sort of environment within which the network host is deployed. An agent collects data points from a corresponding target and sends the data to analytic services 130. An agent in this context may be a process, such as a service or daemon, that executes on a corresponding host machine and/or monitors one or more respective targets. Although only one agent and target is illustrated per host in FIG. 1, the number of agents and/or targets per host may vary from implementation to implementation. Multiple agents may be installed on a given host to monitor different target sources of time series data.

Agents 114a to 114n are communicatively coupled with analytic services 130 via network 120. Network 120 represents one or more interconnected data communication networks, such as the Internet. Agents 114a to 114n may send collected time series data points over network 120 to analytic services 130 according to one or more communication protocols. Example communication protocols that may be used to transport data between the agents and analytic services 130 include, without limitation, the hypertext transfer protocol (HTTP), simple network management protocol (SNMP), and other communication protocols of the internet protocol (IP) suite.

Analytic services 130 include a set of services that may be invoked to process time series data. Analytic services 130 may be executed by one or more of hosts 110a to 110n or by one or more separate hosts, such as a server appliance. Analytic services 130 generally comprise collection logic 132, seasonal analytic logic 134, forecasting logic 136, and uncertainty analytic logic 138. Each logic unit implements a different functionality or set of functions for processing time series data.

Repository 140 includes volatile and/or non-volatile storage for storing time series data 142, classification data 144, and forecast data 146. Repository 140 may reside on a different host machine, such as a storage server that is physically separate from analytic services 130, or may be allocated from volatile or non-volatile storage on the same host machine.

Time series data 142 comprises a set of data points collected by collection logic 132 from one or more of agents 114a to 114n. Collection logic 132 may aggregate collected data points received from different agents such that the data points are recorded or otherwise stored to indicate a sequential order based on time. Alternatively, collection logic 132 may maintain data points received from one agent as a separate time series from data received from another agent. Thus, time series data 142 may include data points collected from a single agent or from multiple agents. Further, time series data 142 may include a single time series or multiple time series.

Classification data 144 stores data that characterizes seasonal patterns detected within time series data 142. As an example, classification data 144 may classify which instances of a season are seasonal highs, seasonal lows, sparse seasonal highs, sparse seasonal lows, etc. as described further below.

Forecast data 146 stores projected values that are generated for a given time series. Forecast data 146 may further identify uncertainty intervals for the projected values of a given forecast. Forecast data 146 may be used to generate plots, interactive charts, and/or other displays that allow a user to view and navigate through generated forecasts.

Clients 150a to 150n represent one or more clients that may access analytic services 130 to detect and characterize time series data. A "client" in this context may be a human user, such as an administrator, a client program, or some other application interface. A client may execute locally on the same host as analytic services 130 or may execute on a different machine. If executing on a different machine, the client may communicate with analytic services 130 via network 120 according to a client-server model, such as by submitting HTTP requests invoking one or more of the services and receiving HTTP responses comprising results generated by one or more of the services. A client may provide a user interface for interacting with analytic services 130. Example user interface may comprise, without limitation, a graphical user interface (GUI), an application programming interface (API), a command-line interface (CLI) or some other interface that allows users to invoke one or more of analytic services 130 to process time series data and generate forecasts.

Seasonal Pattern Analytics for Forecasting

Analytic services 130 includes seasonal analytic logic 134, which receives a set of time series data as input and, in response, identifies and classifies seasonal patterns, if any, that may exist within the input set of time series data. Seasonal analytic logic 134 outputs a seasonality indicator that identifies whether a seasonal pattern was identified. If a seasonal pattern was identified, then seasonal analytic logic 134 may further output data that characterizes the seasonal patterns. Example output data may include, without limitation, classification data identifying how instances of a season are classified (e.g., to which classes and/or sub-classes the instances belong) and seasonal factors indicating the shape of the seasonal patterns. Forecasting logic 136 may use the output of seasonal analytic logic 134 to generate a forecast of future values for the input time series, as described in further detail below.

When analytic services 130 receives a request from one of clients 150a to 150n to generate a forecast for a specified time series, seasonal analytic logic 134 may be invoked to search for and classify seasonal patterns with the time series. The forecasting method that is used may be selected based on whether or not a seasonal pattern is detected within the time series. If a seasonal pattern is detected, then a seasonal forecast is generated based, in part, on the seasonal pattern classifications as described in further below. If a seasonal pattern is not detected, then a linear forecasting method may be used instead.

Figure 2:
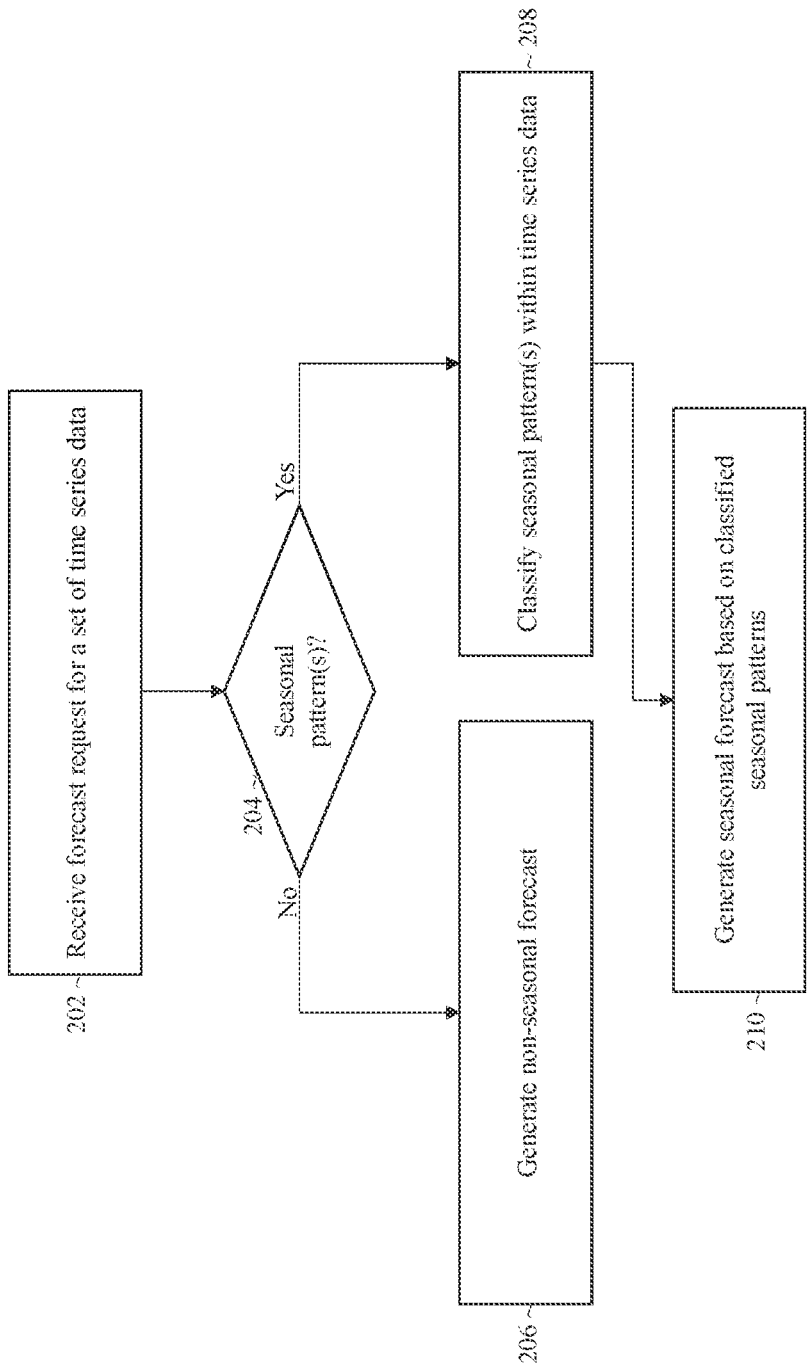
FIG. 2 illustrates an example process for selecting a forecasting method based on an analysis of seasonal characteristics within a set of time series data.

Referring to FIG. 2, it depicts an example process for selecting a forecasting method based on an analysis of seasonal characteristics within a set of time series data. At block 202, a forecast request for a set of time series data is received. The forecast request may identify the time series (or a set of time series) for which a forecast is to be generated and a horizon for the forecast. As an example, a client may submit a request for a forecast of usage values for the next n weeks of a particular resource or set of resources, where n represents a positive integer.

At block 204, the process invokes seasonal analytic logic 134 to determine whether any seasonal patterns are detected within the set of time series data. If a seasonal pattern is not detected, then the process continues to block 206. On the other hand, if a seasonal pattern is detected, then the process continues to block 208.

At block 206, the process generates a non-seasonal forecast for the set of time series data. A non-seasonal forecast may be generated based on trends determined from sample data. For example, a linear forecast may be generated by determining a linear trend line in the time series data and fitting projected values onto the trend line. As another example, an exponential forecast may be generated by mapping values onto an exponential trend line. In another example, a logarithmic forecast may be generated by mapping values onto a logarithmic trend line. Other non-seasonal functions may also be used to fit values to a trend, where the functions may vary depending on the particular implementation.

If a seasonal pattern has been detected, then at block 208, the process classifies the seasonal patterns within the time series data. Example classes/sub-classes may include, without limitation, sparse high, high, sparse low, and/or low. The process may further determine the seasonal factors and shape for the classified seasonal patterns at this block as well.

At block 210, the process generates seasonal forecasts based on the classified seasonal patterns. In some embodiments, different trend lines are calculated for different respective seasonal classes and sub-classes. The seasonal forecast may then be generated by adding or multiplying seasonal factors to the trend line.

Seasonal Pattern Identification

Seasonal analytic logic 134 may analyze seasons of a single duration or of varying duration to detect seasonal patterns. As an example, the time series data may be analyzed for daily patterns, weekly patterns, monthly patterns, quarterly patterns, yearly patterns, etc. The seasons that are analyzed may be of user-specified duration, a predefined duration, or selected based on a set of criteria or rules. If a request received from a client specifies the length of the season as L periods, for instance, then seasonal analytic logic 134 analyzes the time series data to determine whether there are any behaviors that recur every L periods. If no patterns are detected, then seasonal analytic logic 134 may generate an output to indicate that no patterns were detected. On the other hand, if seasonal analytic logic 134 identifies one or more seasonal patterns, then the detected patterns may be classified according to techniques described in further detail below.

Figure 3:
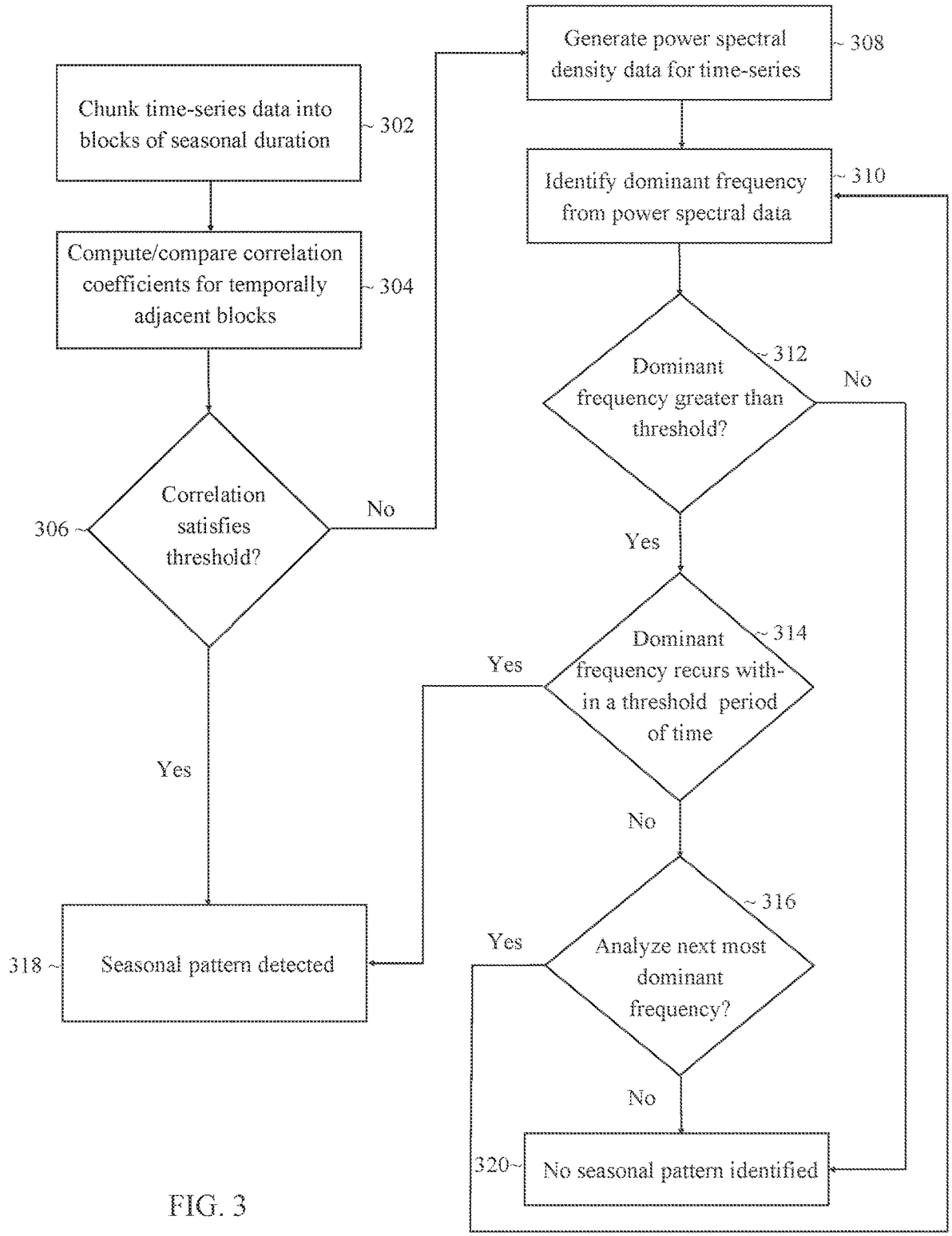
FIG. 3 illustrates an example process for determining whether a seasonal pattern is present within a set of time series data.

Referring to FIG. 3, it depicts an example process for determining whether a seasonal pattern is present within a set of time series data. Blocks 302 to 306 represent an autoregression-based analysis, and blocks 308 to 316 represent a frequency-domain analysis. While both analyses are used in combination to determine whether a seasonal pattern is present in the example process depicted in FIG. 3, in other embodiments one analysis may be performed without the other or the order in which the analyses are performed may be switched. Other embodiments may also employ, in addition or as an alternative to autoregression and frequency-domain based analyses, other stochastic approaches to detect the presence of recurrent patterns within time series data. A recurrent pattern in this context refers to a value, trend, or other characteristics that repeats between multiple instances and/or over multiples sample periods of a season. Recurrent patterns may or may not involve a detected pattern with respect to the trend in the overall magnitude of a signal. For instance, a recurrent pattern may represent a trend in "high" or "low" with respect to the dense signal. A recurrent pattern may allow for a lateral shift, for example up to a threshold amount in terms of time, such that the sparse data points feeding into a sparse pattern may not be perfectly aligned period-to-period.

For the autoregression-based analysis, the process begins at block 302 where the time series data is chunked into blocks of the seasonal duration. As an example, if attempting to detect weekly patterns, then each block of data may include data points that were collected within a one week period of time. Similarly, if attempting to detect monthly patterns, then each block of data may include data points that were collected within a one month period of time.

At block 304, correlation coefficients are calculated between temporally adjacent blocks. There are many different ways in which correlation coefficients may be computed. In some embodiments, temporally adjacent blocks of the seasonal duration are overlaid, and the overlapping signals of time series data are compared to determine whether there is a strong correlation between the two functions. As an example, when attempting to detect weekly patterns, one block containing time series data for a first week may be overlaid with a second block containing time series data for a temporally adjacent week. The signals are compared to compute a correlation coefficient that indicates the strength of correlation between time points within the seasonal periods and the observed values at the time points. The coefficient between time series data from different blocks/seasonal periods may be calculated by estimating the least squares between the overlaid data (e.g., by using an ordinary least squared procedure) or using another autocorrelation function to derive values indicating the strength of correlation between the temporally adjacent blocks.

At block 306, the process determines based on the comparison of the correlation coefficients, whether the correlation between the different blocks of time satisfies a threshold value. The threshold may vary depending on the particular implementation and may be exposed as a user-configurable value. If the number of correlation coefficients does not satisfy the threshold, then the process continues to block 308, and the frequency domain analysis is performed. Otherwise, the process continues to block 318 to indicate that a seasonal pattern has been detected.

For the frequency domain analysis, the process begins at block 308, and power spectral density data is generated for the time series. The power spectral density may be generated by applying a Fast Fourier Transform to the time series data to decompose the data into a set of spectral components, where each respective spectral component represents a respective frequency of a corresponding value observed within the time series data.

At block 310, the process identifies the dominant frequency from the power spectral density data. The dominant frequency in this context represents the value within the time series data that has occurred the most frequently. Values that occur frequently may be indicative of a seasonal pattern if those values recur at seasonal periods.

At block 312, the process determines whether the dominant frequency represents a threshold percent of an amplitude of the overall signal. The threshold may vary depending on the particular implementation and may be exposed as a user-configurable value. Values that represent an insignificant portion of the overall signal are not likely to be associated with recurrent patterns within a time series. Thus, if the dominant frequency does not represent a threshold percent of the overall time series data, then the process continues to block 320. Otherwise, the process continues to block 314.

At block 314, the process determines whether the dominant frequency recurs within a threshold period of time. For instance, if searching for weekly patterns, the process may determine whether the value recurs on a weekly basis with a tolerance of plus or minus a threshold number of hours. If the dominant frequency does not recur at the threshold period of time within the time series data, then the process may determine that a seasonal pattern has not been identified, and the process proceeds to block 316. Otherwise, the process continues to block 318, and the process determines that a seasonal pattern has been detected.

At block 316, the process determines whether to analyze the next dominant frequency within the power spectral density data. In some implementations, a threshold may be set such that the top n frequencies are analyzed. If the top n frequencies have not resulted in a seasonal pattern being detected, then the process may proceed to block 320, where the process determines that no seasonal pattern is present within the time series data. In other implementations, all frequencies that constitute more than a threshold percent of the signal may be analyzed. If there are remaining frequencies to analyze, then the process returns to block 310, and the steps are repeated for the next-most dominant frequency.

Based on the analyses described above, the process determines, at block 318 and 320 respectively, whether there is a seasonal pattern or not within the time series data. If a seasonal pattern is detected, then the process may continue with classifying the seasonal pattern as discussed further below. Otherwise, the process may output a notification to indicate that no seasonal patterns recurring at the specified seasonal duration were detected within the time series data.

The process of FIG. 3 may be repeated to detect patterns in seasons of different durations. As an example, the time series data may first be chunked into blocks containing weekly data and analyzed to detect whether weekly patterns exist. The time series data may then be chunked into blocks containing monthly data and analyzed to detect whether monthly patterns exist. In addition or alternatively, the time series data may be chunked and analyzed across other seasonal periods based on the seasons that a user is interested in analyzing or based on a set of predetermined rules or criteria.

Sparse and Dense Seasonal Classes

A given set of time series data may include different classes of seasonal patterns such as sparse seasonal patterns and/or dense seasonal patterns. A feature/pattern is considered sparse if its duration within a season is less than a threshold thereby indicating that the exhibited behavior is an outlier. Sparse features generally manifest as an isolated data point or as a small set of data points that are far removed from the average data point within the time-series. Conversely, a feature/pattern may be considered dense if its duration within a season satisfies the threshold (e.g., falls within the threshold or is higher than the threshold), indicating that the exhibited behavior is not an outlier. In some embodiments, a dense signal represents a plurality of instances of time-series data that (1) significantly represents an entire period or sub-period of data and (2) exclude a relatively small portion (e.g., 1%, 5%, or some other threshold) of the data as outliers that are not the subject of the fitted signal. A sparse signal may represent data points that are excluded from the dense class of data points as outliers. For example, a dense signal may approximate a seasonal period or sub-period of a time series by, for each time increment in the time series, approximating the data point that is, over multiple historical instances of the time series in multiple historical instances of the time increment, average, most likely, most central, has the least average distance, or is otherwise a fit or best fit for the multiple historical instances of the time increment. In one embodiment, if there is no single data point that can approximate, with a certain level of confidence or significance, a particular time increment, that time increment can be classified as not having a dense signal.

There are many possible causes of a sparse signal within a set of time series data. As an example, a sparse signal may correspond to a sudden surge (a sparse high) or drop-off (a sparse low) in the usage of a particular target resource. In some instances, the sparse signal may be noise, such as activity cause by an anomalous event. In other instances, a surge or drop-off may be caused by a recurrent seasonal event, such as a periodic maintenance operation.

For a given set of time series data, a noise signal may have a magnitude that dominates that of a smaller dense pattern. Without a separate treatment of sparse and dense features in the time series data, a dense pattern may potentially be overlooked due to the magnitude of the overlaid noise. In order to prevent the dense pattern from going unclassified, the noise/sparse data may isolated from the dense data within a time series. Separate processing for the sparse and dense features of a time series may then be provided when performing classification and forecasting, as described in further detail below.

In some embodiments, a time series is decomposed into a noise signal and a dense signal where the noise signal, also referred to herein as a sparse signal or sparse component, captures the sparse distribution of data in a time series that otherwise has a dense distribution and the dense signal, also referred to herein as the dense component, captures the dense distribution of data, removing the noise signal. The manner in which a set of time series data is decomposed into a sparse component and dense component may vary depending on the particular implementation. In some embodiments, the dense component may be obtained from the seasonal factors of an Additive Holt-Winters model. As previously indicated, the Holt-Winters model employs triple exponential smoothing to obtain the seasonal index. The applied smoothing, in effect, removes the sparse component of the original time series signal. The result is a time series that includes the dense features of the original time series. While the Additive Holt-Winters model may be used to generate a dense signal for a time series, in other embodiments, other techniques, such as other localized averaging or smoothing functions, may be used to obtain the dense signal. Once the dense component has been generated and stored, the noise component may be determined by taking the original set of time series data and subtracting out the dense component from the original signal. The resulting noise signal is a time series that includes the noise features from the original time series.

Seasonal Pattern Classification

A time series may include one or more classes of seasonal patterns. Example classes of seasonal patterns may include, without limitation, recurrent seasonal highs and recurrent seasonal lows. Each of these classes may further be broken into sub-classes including without limitation, recurrent sparse seasonal highs, recurrent sparse seasonal lows, recurrent dense seasonal highs, and recurrent dense seasonal lows. Other classes and sub-classes may also be used to characterize seasonal patterns within time series data, depending on the particular implementation. The term "class" as used herein may include both classes and sub-classes of seasonal patterns.

Figure 4:
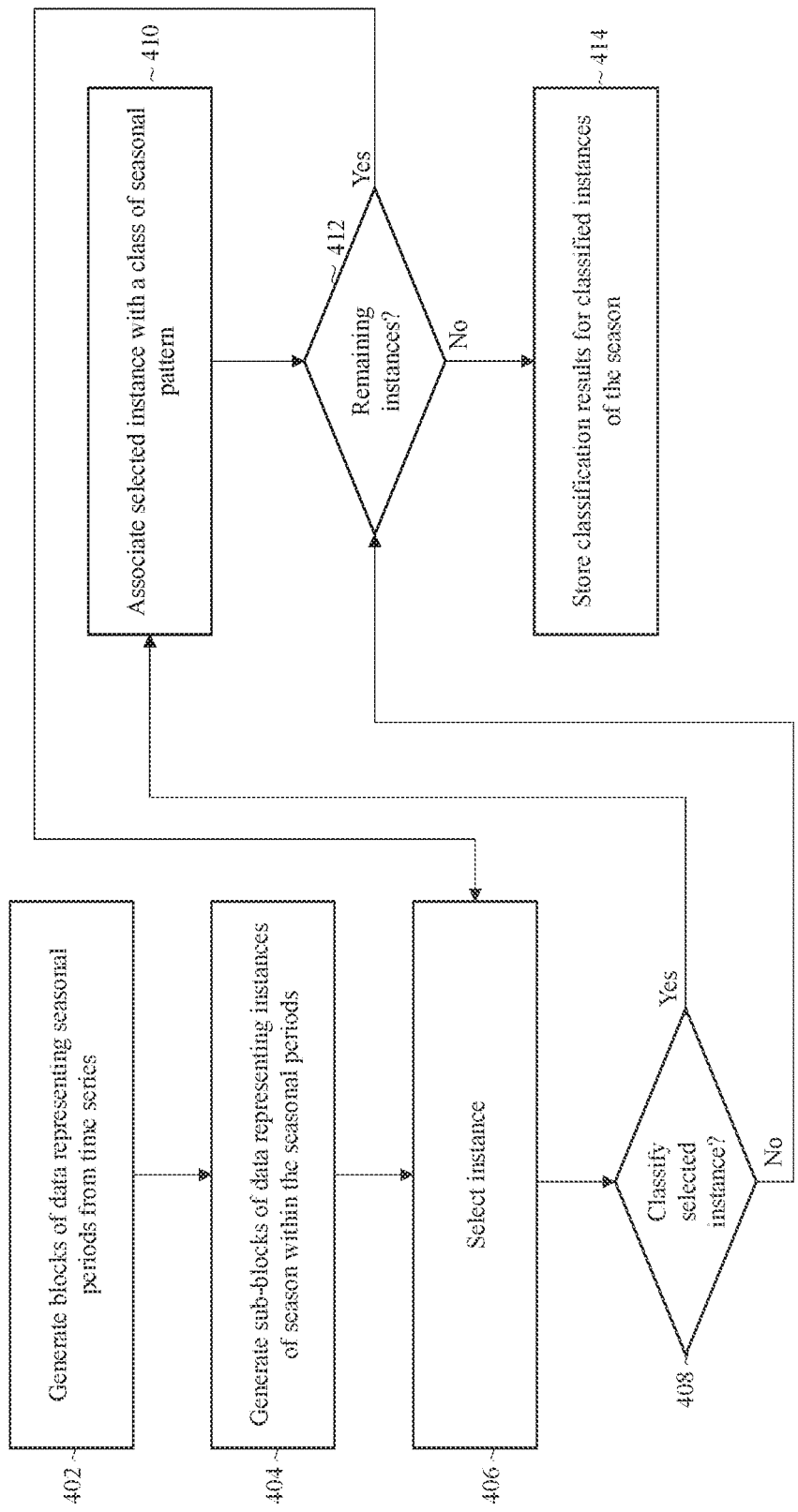
FIG. 4 illustrates an example process for classifying seasonal patterns that were identified within a set of time series data.

In some embodiments, seasonal analytic logic 134 classifies seasonal patterns that are detected within an input set of time series data. Referring to FIG. 4, it depicts an example process that may be implemented by seasonal analytic logic 134 to classify seasonal patterns.

At block 402, the time series data is preprocessed by generating blocks of data, where each block of data represents one seasonal period or sample of a season within the time series and includes data from the time series that spans a time period of the seasonal duration. As an example, if a time series includes data spanning twenty-five weeks and the length of a season is one week of time, then the time series data may be chunked into twenty-five blocks, where the first block includes data points collected during the first week, the second block data points collected during the second week, etc.

At block 404, the process generates, for each block of data, a set of sub-blocks, where each sub-block of data represents one instance of a season and includes time series data spanning a sub-period of the instance duration. The duration of the instance may vary from implementation to implementation. As an example, for a weekly season, each instance may represent a different hour of time within the week. Thus, a block representing a full week of data may be segmented into one hundred and sixty-eight sub-blocks representing one-hundred and sixty-eight different instances. If an instance is defined as representing sub-periods that are two hours in duration, then a block representing a week may be segmented into eighty-four sub-blocks. As another example, for a monthly season, an instance may correspond to one day of the month. A block representing one month may then be segmented into twenty-eight to thirty-one sub-blocks, depending on the number of days in the month. Other sub-periods may also be selected to adjust the manner in which time series data are analyzed and summarized.

At block 406, the process selects an instance of the season to analyze and determine how it should be classified. The process may select the first instance in a season and proceed incrementally or select the instances according to any other routine or criteria.

At block 408, the process determines whether and how to classify the selected instance based, in part, on the time series data for the instance from one or more seasonal samples/periods. In the context of weekly blocks for example, a particular instance may represent the first hour of the week. As previously indicated, each block of time series data represents a different seasonal period/sample of a season and may have a set of sub-blocks representing different instances of the season. Each seasonal sample may include a respective sub-block that stores time series data for the sub-period represented by the instance. The process may compare the time series data within the sub-blocks representing the first hour of every week against time series data for the remaining part of the week to determine how to classify the particular instance. If a recurrent pattern for the instance is detected, then the process continues to block 410. Otherwise the process continues to block 412.

At block 410, the process associates the selected instance of the season with a class of seasonal pattern. If a recurrent high pattern is detected based on the analysis performed in the previous block, then the instance may be associated with a corresponding class representing recurrent seasonal highs. Similarly, the instance may be associated with a class representing recurrent seasonal lows if the process detects a recurrent low pattern from the time series data within the associated sub-blocks. In other embodiments, the respective instance may be associated with different seasonal patterns depending on the recurrent patterns detected within the sub-blocks. To associate an instance with a particular seasonal class, the process may update a bit corresponding to the instance in a bit-vector corresponding to the seasonal class as described in further detail below.

In some cases, the process may not be able to associate an instance with a class of seasonal pattern. This may occur, for instance, if the time series data within the corresponding sub-period does not follow a clear recurrent pattern across different seasonal periods. In this scenario, the process may leave the instance unclassified. When an instance is left unclassified, the process may simply proceed to analyzing the next instance of the season, if any, or may update a flag, such as a bit in a bit-vector, that identifies which instances the process did not classify in the first pass.

At block 412, the process determines whether there are any remaining instances of the season to analyze for classification. If there is a remaining instance of the season to analyze, then the process selects the next remaining instance of the season and returns to block 406 to determine how to classify the next instance. Otherwise, the process continues to block 414.

At block 414, the process stores a set of classification results based on the analysis performed in the previous blocks. The classification results may vary from implementation to implementation and generally comprise data that identifies with which seasonal class instances of a season have been associated, if any. As an example, for a given instance, the classification results may identify whether the given instance is a recurrent high, a recurrent low, or has been left unclassified. Unclassified instances may subsequently be classified based on further analysis. For instance, a homogenization function may be applied to classify these instances based on how adjacent instances in the season have been classified.

Figure 5:
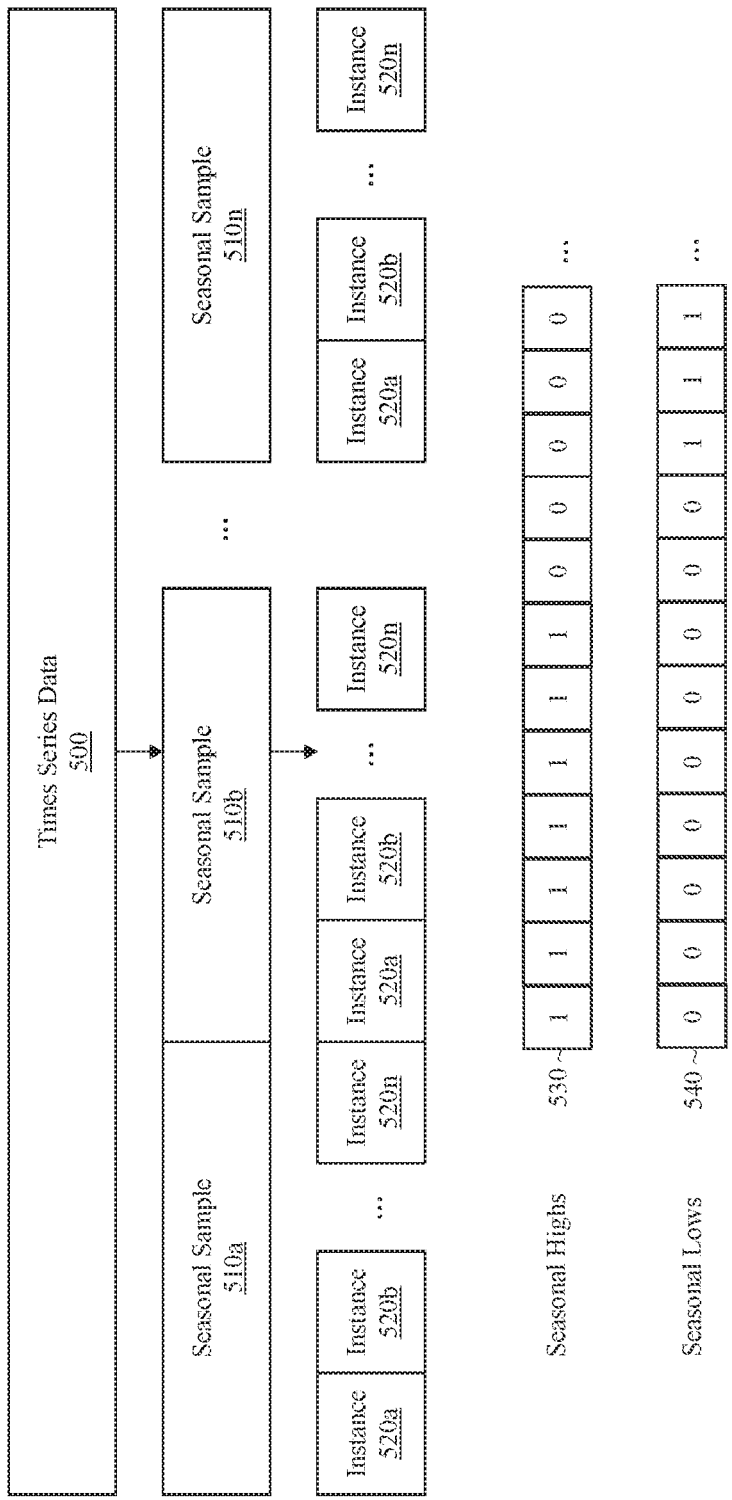
FIG. 5 illustrates an example set of classification results for classifying instances of a season.

In some embodiments, the classification of a set of instances may be stored as a set of one or more bit-vectors (also referred to herein as arrays). Referring to FIG. 5, for instance, it depicts an example classification for instances of a season detected within a set of time series data. To obtain the classification results, time series data 500 is chunked into season samples 510a to 510n. Each of seasonal samples 510a to 510n is further chunked according to the instances of a season, represented by blocks 520a to 520n, which represent n instances within the season. In the context of a weekly season, each seasonal sample may represent one week of time series data, and each instance may represent one-hour sub-periods or sub-periods of other duration within the weekly season. The seasonal samples may represent other seasonal durations and/or the instances may represent other sub-periods, depending on the particular implementation. A set of bit-vectors classify the instances of the season and include bit-vector 530, which represents a first class for seasonal highs, and bit-vector 540, which represents a second class for seasonal lows. Other bit-vectors may also be generated to represent different seasonal pattern classifications such as sparse high, sparse low, etc. Different bits within a bit-vector correspond to different instances of a season and act as a Boolean value indicating whether the corresponding instance is associated with a class or not. For instance, the first seven bits may be set to "1" in bit-vector 530 and "0" in bit-vector 540 to indicate that the first seven instances of the season are a high season across seasonal samples 510a to 510n. A subsequent sequence of bits may be set to "0" in both bit-vector 530 and bit-vector 540 to indicate that the corresponding instances of the season are unclassified. Similarly, a subsequent sequence of bits may be set to "0" in bit-vector 530 and "1" in bit-vector 540, to indicate that the corresponding sequence of instances of the season are a low season across seasonal samples 510a to 510n.

The length of a bit-vector may vary depending on the number of instances within a season. In the context of a week-long season, for instance, bit-vectors 530 and 540 may each store 168 bits representing one hour sub-periods within the season. However, the bit-vectors may be shorter in length when there are fewer instances in a season or longer in length when a greater number of instances are analyzed. This allows flexibility in the granularity by which seasonal instances are analyzed and classified.

Voting-Based Classification

When determining how to classify instances of a season, seasonal analytic logic 134 may implement a voting-based approach according to some embodiments. Voting may occur across different classification functions and/or across different seasonal periods. Based on the voting, a final, consensus-based classification may be determined for an instance of a season.

A classification function refers to a procedure or operation that classifies instances of a season. A classification function may employ a variety of techniques such as quantization, clustering, token counting, machine-learning, stochastic analysis or some combination thereof to classify instances of a season. While some implementations may employ a single classification function to classify instances of a season, other implementations may use multiple classification functions. Certain classification functions may generate more optimal classifications for volatile sets of time series data that include large fluctuations within a seasonal period or across different seasonal periods. Other classification functions may be more optimal for classifying instances in less volatile time series data. By using a combination of classification functions, where each classification function "votes" on how to classify an instance of a season, the risk of erroneous classifications may be mitigated and a more reliable final classification may be achieved.

In some embodiments, a classification may use token counting to classify instances of a season. With token counting, an instance of a season is analyzed across different seasonal periods/samples to determine whether to classify the instance as high or low. In the context of a weekly season, for example, the sub-periods (herein referred to as the "target sub-periods") represented by different instances within each week are analyzed. If the averaged value of the time series data within a target sub-period represented by an instance is above a first threshold percent, then the sub-period may be classified as a high for that week. If the value is below a second threshold percent, then the sub-period may be classified as a low for that week. Once the target sub-period has been classified across different weeks, then the instance may be classified as high if a threshold number (or percent) of target sub-periods have been classified as high or low if a threshold number (or percent) of target sub-periods have been classified as low.

In addition or as an alternative to token counting, some embodiments may use k-means clustering to classify seasonal instances. With k-means clustering, data points are grouped into clusters, where different data points represent different instances of a season and different clusters represent different classes of a season. As an example, a first cluster may represent recurrent highs and a second cluster may represent recurrent lows. A given data point, representing a particular instance of a season, may be assigned to a cluster that has the nearest mean or nearest Euclidean distance.

In some embodiments, spectral clustering may be used to classify instances of a season. With spectral clustering, a similarity matrix or graph is defined based on the instances within a seasonal period. A row or column within the similarity matrix represents a comparison that determines how similar a particular instance of a seasonal period is with the other instances of the seasonal period. For instance, if there are 168 instances within a weekly seasonal period, then a 168 by 168 similarity matrix may be generated, where a row or column indicates the distance between a particular instance with respect to other instances within the seasonal period. Once the similarity matrix is created, one or more eigenvectors of the similarity matrix may be used to assign instances to clusters. In some cases, the median of an eigenvector may be computed based on its respective components within the similarity matrix. Instances corresponding to components in the eigenvector above the median may be assigned to a cluster representing a seasonal high, and instances corresponding to components below the mean may be assigned to a second cluster representing seasonal lows. In other cases, partitioning may be performed based on positive or negative values of the eigenvector rather than above or below the median. Other partitioning algorithms may also be used depending on the particular implementation.

When multiple classification functions are used, each classification function may generate a corresponding result (or set of results) that classifies instances belonging to a particular season. As an example, a first classification function may generate a first bit-vector result that identifies which instances to classify as recurrent highs and a second bit-vector that identifies which instances to classify as recurrent lows, where each respective bit in a bit-vector corresponds to a different instance of the season. Other classification functions may similarly generate a set of bit-vectors that classify instances as highs or lows. The number of classification results that are generated may vary from implementation to implementation depending on the number of classes of season and the number of functions involved in classification.

The result sets of different classification functions may be processed as "votes" to classify the set of instances in a certain way. For instance, the first bit of a bit-vector may be processed as a vote to associate the first instance of a season with a particular seasonal class, the second bit may be processed as a vote to associate the second instance of the season with a particular seasonal class, etc. The results may be combined to determine a final classification for each instance of the season. The manner in which the results are combined may be determined based on a set of voting rules, as described in further detail below.

Voting may occur across a different seasonal periods/samples as well. For example, if a time series is chunked into n blocks corresponding to n different seasonal periods, where n represents an integer value greater than one, a classification function may generate n bit-vector results for a particular class of season. Referring to FIG. 5, for instance, plurality of bit-vectors may be generated to classify seasonal high sub-periods across different seasonal samples 510*a* to 510*n*, with each bit-vector corresponds to a different seasonal sample. A bit at a particular position within each bit-vector in this case would classify a corresponding instance of a season based on the characteristics of that instance as analyzed for the respective seasonal period. Thus, the first bit in a first bit-vector may classify a first instance of a season based on an analysis of seasonal sample 510*a*, the first bit of a second bit-vector may characterize the first instance of the season based on the characteristics of seasonal sample 510*b*, etc. Similarly the second bit of each of the different bit-vectors may classify the second instance of a season based on the respective characteristics of seasonal periods 510*a* and 510*n*, the third bit classifies the third instance, etc. A bit may thus act as a "vote" for associating an instance with a particular class based on an analysis of a corresponding seasonal period. The bit-vector results from different seasonal periods may then be combined based on a set of voting rules to generate a final consensus bit-vector result that classifies the instances of a season.

For a given set of time series data, instances of a season may be classified based on one or more voting rules, which may vary from implementation to implementation. Using a majority-vote rule, for example, an instance may be assigned to the seasonal class that has the majority of votes. In other words, an instance is associated with the seasonal class that it has been associated with by the majority of classification functions and/or across the majority of seasonal periods. If a classification function or seasonal period has associated the instance with a different seasonal class and is in the minority, it is overruled by the majority vote. In other implementations, other voting thresholds may be used. For instance, an instance may be classified as high if the corresponding sub-periods were classified as high greater than a threshold percentage and low if it was classified as low greater than a threshold percentage. As another example, the final, consensus classification may be based on a unanimous vote. If a unanimous vote is not reached, then the instance may remain unclassified. Different classification functions may also be given equal or different voting weights. Thus, classification functions that tend to be more reliable may be given stronger voting influence over the final classification of a season.

Seasonal Factor Derivation

As previously indicated, seasonal analytic logic 134 may output seasonal factors for different instances of a season. A seasonal factor in this context is a measure of the seasonal fluctuation that is associated with a given instance/sub-period of a season, and may be additive or multiplicative in nature. In other words, a seasonal factor represents a deviation above or below a seasonally adjusted average. For example, the number of database logons for the instance representing Monday, 9-10 may be 100 logons more or 100 times more than the average sample value within a season (or seasonal class). Additive seasonal factors may be computed based on the difference of the actual observed values for an instance and the average seasonally adjusted value for the season. Eq. (3) is an example formula that may be used to calculate additive seasonal factors. Multiplicative seasonal factors may be computed based on the ratio of the actual observed values for the instance to the average seasonally adjusted value for the season. Eq. (7) above is an example formula that may be used to calculate multiplicative seasonal factors.

In some embodiments, seasonal factors may be computed based on the seasonal class/sub-class with which an instance is associated. As an example, an instance that is classified as a sparse high may have a seasonal factor that is computed based on the difference of the actual observed values for that instance and the average seasonally adjusted values for other sparse highs in the season. Similarly, an instance that is classified as a dense high may have a seasonal factor that is computed based on the difference of the actual observed values for that instance and the average seasonally adjusted values for other dense highs in the season. Thus, the seasonal factors may be computed in a context-specific manner that accounts for seasonal classifications of the instance.

Forecast Generation by Seasonal Class

Forecasting logic 136 performs seasonal forecasting based on the seasonal characteristics associated with an input set of time series data. In an embodiment, forecasting logic 136 receives, as input, a time series, seasonal classifications/characteristics extracted from the time series by seasonal analytical logic 134, and a horizon identifying how far past the end of the time series to generate forecasted values. Forecasting logic 136 outputs a forecast that begins at the end of the input time series and progresses up to the specified horizon. As an example, for an n week horizon, forecasting logic 136 generates a forecast n weeks past the end time of the input time series. As another example, the horizon may be specified as a particular date or as a stretch of time in terms of hours, days, months, etc.

Forecasting logic 136 may decompose or separate the input time series by seasonal class/sub-class to provide separate forecasting analysis for the different seasonal classes. For example, sample values from the sparse high sub-class may be separated from sample values from the dense high and low sub-classes. Decomposing the time series into different signals in this manner allows forecasting logic 136 to analyze averages, trends, and seasonal factors independently for each seasonal class.

Figure 6:
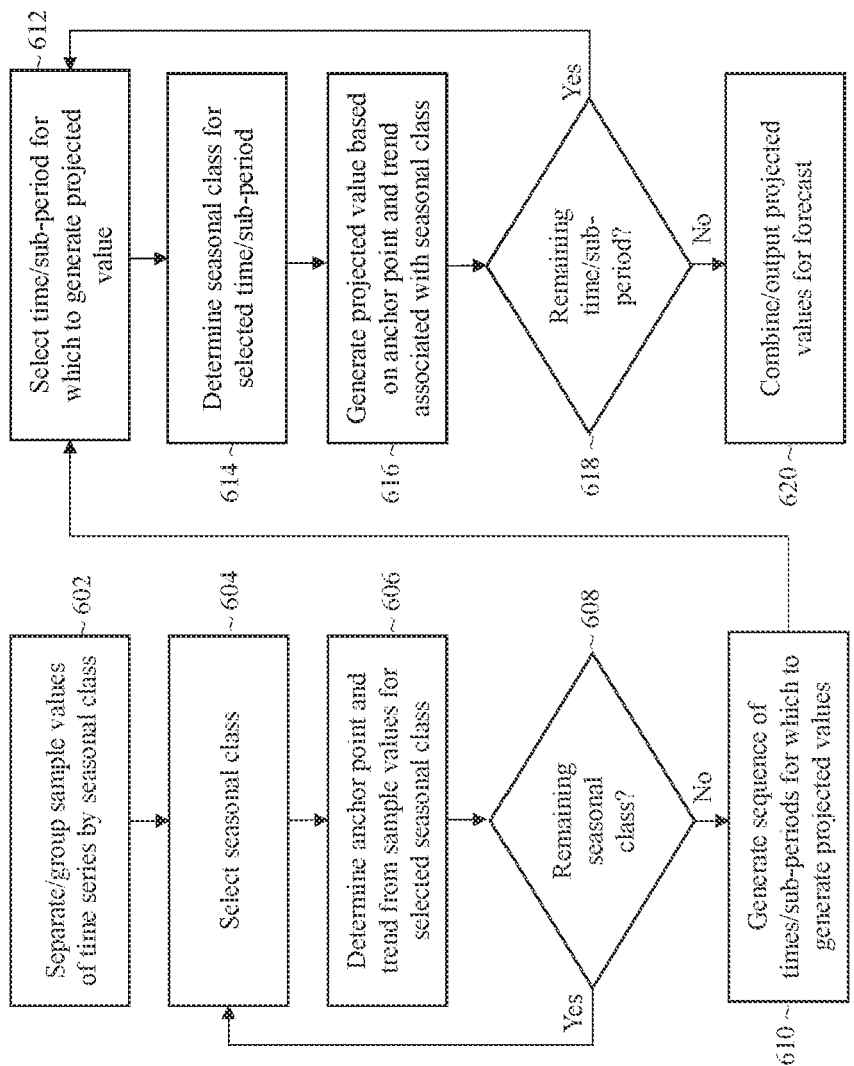
FIG. 6 illustrates an example process for generating a forecast based on seasonal analytics.

Referring to FIG. 6, it depicts an example process for generating a forecast based on seasonal analytics. At block 602, the process separates and groups sample values from an input time series by seasonal class/sub-class. For instance, if an instance of a weekly season corresponding to Friday 9-10 is classified as a weekly sparse high, then sample values collected for that instance may be grouped and stored in a data structure for weekly sparse high samples. Sample values for weekly dense highs and weekly lows may be separately grouped and stored in independent data structures. The number of classes/sub-classes and the manner in which data is classified may vary depending on the particular implementation.

At block 604, the process selects a seasonal class for performing a forecasting analysis. For instance, the process may select seasonal sparse highs, dense highs, lows, or some other seasonal class/sub-class to analyze the sample values that have been grouped into the selected seasonal class/sub-class.

At block 606, the process determines an anchor point and a trend rate from the sample values for the selected seasonal class/sub-class. The anchor point in this context represents an average value for the selected seasonal class and/or sub-class. In an embodiment, the anchor point may be computed by averaging values in the last seasonal period of samples in the class. In the context of a weekly season, for example, the anchor point for a sparse high may be determined by computing the average value in the last week for sample values that have been classified as sparse highs. Similarly, the anchor point for dense highs and lows may be determined by computing the average value for the dense highs and lows, respectively in the last week of time series data. In other embodiments, the anchor point may be determined by averaging sample values from more than one seasonal period.

The trend rate represents a change in direction for the average value in the selected seasonal class or sub-class. The trend rate may be computed by performing a linear, exponential, logarithmic or some other functional fit for values that have been grouped into the selected seasonal class or sub-class. For example, if there are two weeks of sample values for the sparse high sub-class, then a line may be computed by minimizing the sum of squared deviations from the two weeks of sample values, where the slope of the line represents the trend rate.

At block 608, the process determines whether there are remaining seasonal classes (or sub-classes). If so, then the process returns to block 604. Thus, an anchor point and a trend rate is determined based on sample values associated with the next seasonal class. In other words, the process may calculate different trend rates and anchor points for different seasonal classes and sub-classes. Sparse highs may be trending in one direction (up or down) while dense highs may be trending in a different direction or at a different rate. Multiple trends may thus be determined from the same set of time series data.

At block 610, the process generates an array or some other data structure or set of data structures where elements in the array/data structure(s) correspond to different times and sub-periods for which to generate projected values. The sub-periods may correspond to the length of a seasonal instance in some embodiments. For example, in the context of weekly seasons, a one week projection may include 168 projected values, a two week projection 336 projected values, etc., where each projected value corresponds to a different hour of the week.

At block 612, the process selects a sub-period for which to generate a projected value. For instance, the process may start at the first sub-period from the end of the input time series and continue toward the end sub-period at the specified horizon.

At block 614, the process determines the seasonal class and/or sub-class that is associated with the selected sub-period. As an example, if the selected sub-period corresponds to Monday, 9-10, then the process may determine whether the sub-period has been classified as a sparse high, dense high, sparse low, dense low, or in some other manner.

At block 616, the process generates a projected value based on the anchor point and trend associated with the seasonal class or sub-class. In the context where values are grouped into a sparse high class, a high class, and a low class, the forecasted value at sample/sub-period (t) may be calculated as follows:
If t maps to a sparse high, then $$F_t = SF_t + TR\_SH_{t-i} + A\_SH \quad (9)$$

If t maps to a high, then $$F_t = SF_t + TR\_H_{t-i} + A\_H \quad (10)$$

Otherwise $$F_t = SF_t + TR\_NH_{t-i} + A\_NH \quad (11)$$

where $F_t$ represents the forecast value for the sample at the given sub-period/time, $SF_t$ is the seasonal factor for that sub-period, $TR\_SH_{t-i}/TR\_H_{t-i}/TR\_NH_{t-i}$ represent the trend rate for sparse high, high and not high, respectively, i represents the end time of the input time series, and $A\_SH/A\_H/A\_NH$ represent the anchor points for sparse high, high and not high, respectively.

At block 618, the process determines whether there are remaining sub-periods for which to generate forecasted values. If the horizon has not been reached, then the process returns to block 612 and selects the next sub-period in the sequence. The process then computes the forecasted value for the next sub-period based on how the corresponding instance has been classified. If there are no remaining sub-periods in the sequence, then the process continues to block 620.

At block 620, the process stores, displays, and/or otherwise outputs the projected values in the forecast. For example, a graph, chart, or other display may be generated that combines observed values from one or more observed seasonal periods within the time series with projected values for one or more future seasonal periods for which no observed data has been collected. The projected values for the different seasonal classes may be stitched together or otherwise combined into a single plot or other graphic to provide an overall forecast and/or may be isolated into separate graphics.

Forecast Uncertainty Based on Seasonal Pattern Classifications

Uncertainty analytic logic 138 determines a set of one or more uncertainty values for a given forecast. The uncertainty values may include residuals, confidence intervals, projection intervals, and/or tolerance intervals depending on the particular implementation.

A tolerance interval models uncertainty in a way that allows the user to understand whether or not the system has a significant likelihood of exceeding a tolerance. Confidence intervals, which may also be computed for a forecasting model, differ in that the confidence interval is used to indicate an interval where the average value or variance within a forecast is expected to fall. By contrast, the tolerance interval is used to indicate a range where an individual forecasted value is expected to fall. In other words a tolerance interval may be mathematically defined to be the range of values that will contain a threshold percentage of future samples. The confidence interval's width is based on the sampling error and is generally narrower than the tolerance interval's width, which is based both on the sampling error and the variance in values.

The tolerance interval for a prescribed confidence of $\gamma$ may defined to be $\bar{s} \pm \lambda s$ such that $$\frac{1}{\sqrt{2\pi\sigma^2}} \int_{x-\lambda s}^{x+\lambda s} e^{-(t-\mu)^2/2\sigma^2} dt \geq \gamma; \quad (12)$$

where $\bar{x}$ is the sample mean, $s^2$ is the sample variance, $\sigma$ is the standard deviation, and t is the sample time.

In some cases, the tolerance interval may be focuses on the standard normal distribution without loss of generality. As a result, the tolerance interval can also be defined to be $\bar{x} \pm \lambda s$ such that $$\frac{1}{\sqrt{2\pi}} \int_{x-\lambda s}^{x+\lambda s} e^{-t^2/2} dt \geq \gamma \quad (13)$$

The integral statement of Eq. 13 translates to a statement where $\lambda s \geq r$ with r being the root of $$\frac{1}{\sqrt{2\pi}} \int_{x-r}^{x+r} e^{-t^2/2} dt = \gamma.$$

Upon further analysis, $\lambda s \geq r$ may be rewritten as $$(n-1)s^2 \geq \frac{(n-1)r^2}{\lambda^2}.$$

The reason for this modification is that for the standard normal distribution, $(n-1)s^2$ has a chi-squared distribution with $n-1$ degrees of freedom. If the confidence of the fit is equal to the confidence of the tolerance interval (i.e. $\beta=\gamma$) then this results in the following:

$$\chi^2_{n-1,\gamma} \geq (n-1)s^2 \geq \frac{(n-1)r^2}{\lambda^2} \quad (14)$$

With further analysis, it may be determined that $$\lambda \geq \sqrt{\frac{(n-1)r^2}{\chi^2_{n-1,\gamma}}}$$

and as a result, the following equation derived:

$$r^2 \approx \left(1 + \frac{1}{n}\right) \chi^2_{(1-\gamma)/2}. \quad (15)$$

Figure 7:
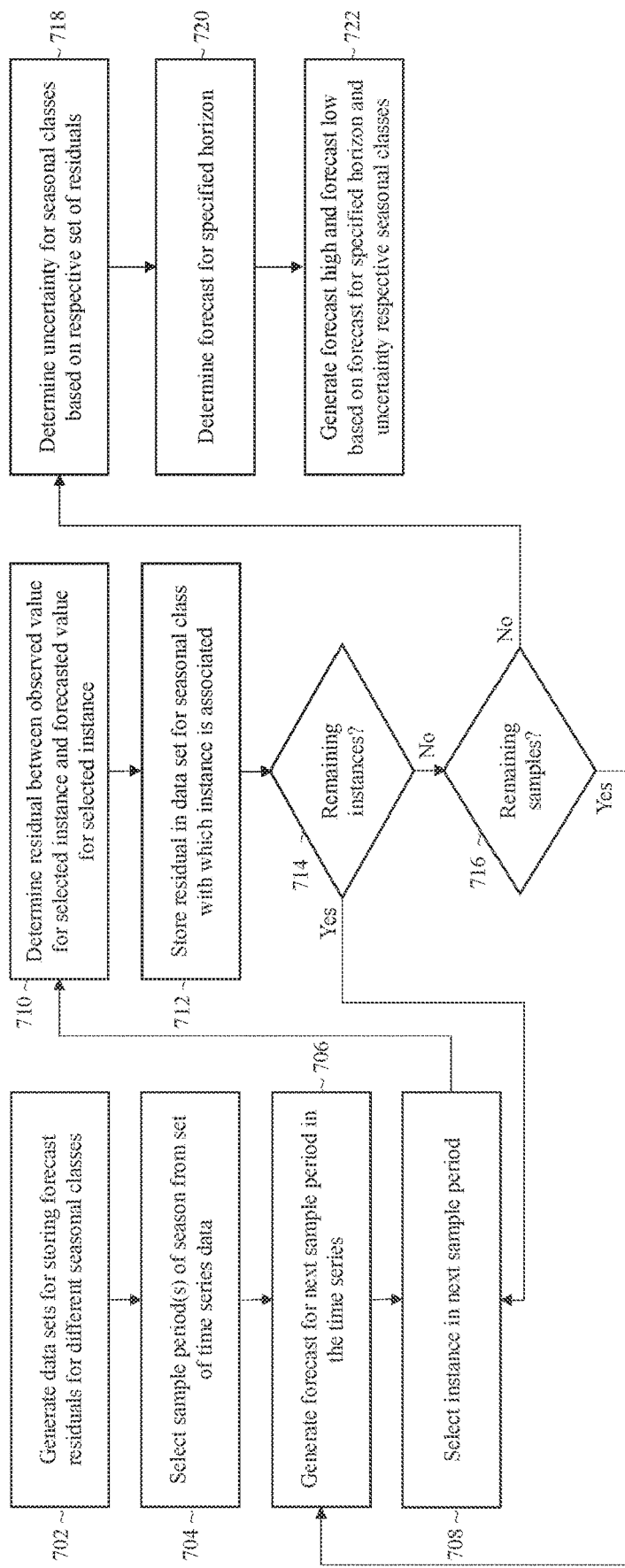
FIG. 7 illustrates an example process for generating a forecast high and forecast low based on a set of residuals stored for the different seasonal classes.

As with the projected values described above, uncertainty values may be derived based in part on the seasonality analytics applied to a set of time series. Referring to FIG. 7, it depicts an example process for generating a forecast high and forecast low based on a set of residuals stored for the different seasonal classes and/or sub-classes. The forecast high and forecast low may represent the upper and lower bounds of a tolerance interval according to one embodiment.

At block 702, the process generates data sets for storing forecast residuals for different seasonal classes and/or sub-classes. As an example, a first data set may be generated to store residuals for sparse highs, a second data set to store residuals for dense highs, and a third data set of residuals for non-highs.

At block 704, the process selects one or more sample periods of a season from a set of time series data. For instance, if a time series includes four weeks of data where a season corresponds to a one week period, then the process may initially select the first two or three weeks of data to analyze. In the context of monthly seasons, one or months of sample data may be selected at this step.

At block 706, the process generates a forecast for the next sample period in the time series. If the first two weeks of data were selected at block 704, then a forecast for the third week of data may be computed according to the techniques described in the previous sections. If three weeks of data were selected, then a forecast for the fourth week of data may be computed.

At block 708, an instance is selected in the next sample period to analyze the difference between the forecasted value and the actual, observed value. In the context of a weekly season, for example, the first instance in the week may be initially selected to analyze.

At block 710, the process determines the residual between the observed value for the selected instance and the forecasted value for the selected instance. The residual in this context is a value that measures or otherwise identifies the difference between the observed and forecasted value. As an example, if the selected instance corresponds to a measure of resource usage on Monday, 9-10 for the third week, then the observed resource usage may be compared to the projected resource usage to compute the residual.

At block 712, the process stores the residual in a data set for the seasonal class with which the instance is associated. If Monday, 9-10 corresponds to a sparse high, for instance, then the residual is stored in a data set corresponding to sparse highs. If, on the other hand, the sub-period corresponds to a dense high or some other seasonal class/sub-class, then the residual may be mapped to the data set that stores residuals for the corresponding seasonal class/sub-class.

At block 714, the process determines whether there are any remaining instances to analyze. If there are remaining instances, then the process selects the next instance in the sample period to compute the residual for the next instance. In the context of a weekly season, for example, the process may repeat to compute the residual for 168 one-hour instances. If there are no remaining instances, then the process continues to block 716.

At block 716, the process determines whether there are remaining samples to analyze. If there are remaining samples to analyze, then the process returns to block 706, and a forecast is generated for the next sample period in the time series in order to compute residuals. For instance, if four weeks of data were initially provided, then the process may Evaluate FORECAST week 3 from inputs of weeks 1-2, seasonal factors, and horizon=1 week, calculate difference/residual between the observed week 3 and forecasted week 3, and save each residual to the appropriate set of residuals for the season in which it is in; and then
Evaluate FORECAST week 4 from inputs of weeks 1-3, seasonal factors, and horizon=1 week, calculate difference/residual between the observed week 3 and forecasted week 3, and save each residual to the appropriate set of residuals for the season in which it is in.

At block 718, the process determines the uncertainty for the seasonal classes and/or sub-classes based on the respective set of residuals. For instance, an uncertainty may be determined for sparse highs, dense highs, lows, etc. This allows the uncertainty to be computed independently and analyzed granularly by seasonal class. In a scenario where sparse highs are consistent, the uncertainty may be much less than for other seasonal classes. Thus, the uncertainty may vary by seasonal class/sub-class.

At block 720, the process determines the forecast for a horizon specified in the forecast request. In an embodiment, the forecast is computed according to the process depicted in the section above.

At block 722, the process generates a forecast high and forecast low based on the forecast for the specified horizon and the uncertainty of the respective seasonal classes. In an embodiment, the forecast high and low are generated by adding or subtracting, respectively, the uncertainty from the forecasted value. For instance the following equations may be used to compute the forecast high and low for sample sub-period t:

If t maps to a sparse high, then $$FH_t = F_t + USH \quad (16)$$

$$FL_t = F_t - USH \quad (17)$$

If t maps to a high, then $$FH_t = F_t + UH \quad (18)$$

$$FL_t = F_t - UH \quad (19)$$

Otherwise $$FH_t = F_t + UNH \quad (20)$$

$$FL_t = F_t - UNH \quad (21)$$

where $FH_t$ is the forecast high value, $FL_t$ is the forecast low value, $F_t$ is the projected forecast value, USH is the sparse high uncertainty computed from the residuals from the sparse high class, UH is the high uncertainty computed from the residuals from the high class, and UNH is the uncertainty computed from the residuals from samples that were not classified as seasonal highs (sparse or dense).

Figure 8:
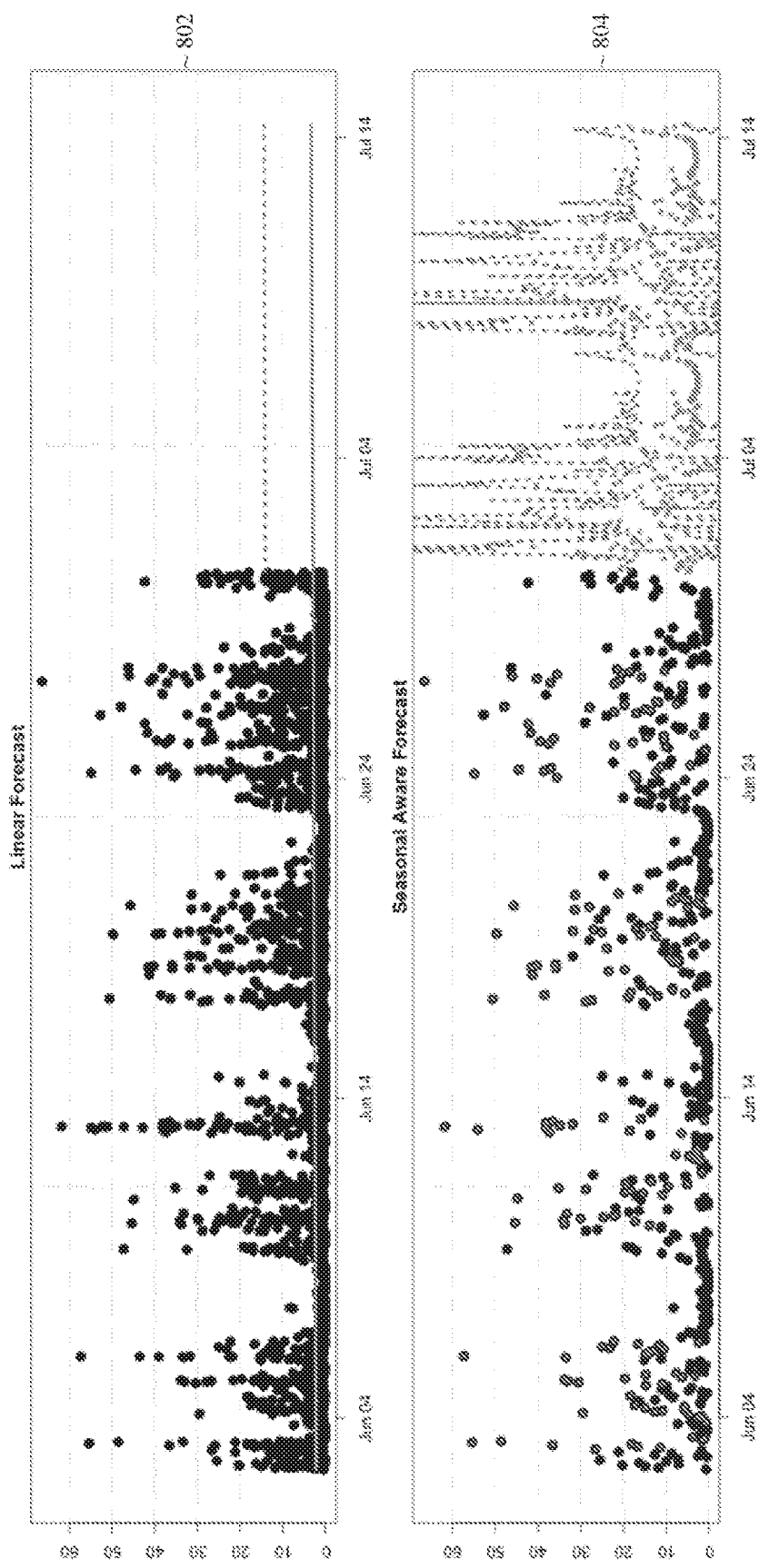
FIG. 8 illustrates an example of a linear forecast and an example of a seasonal forecast with a displayed tolerance interval.

FIG. 8 illustrates a comparison of an example linear forecast and an example seasonal forecast according to an embodiment. The linear forecast, depicted in chart 802 plots a line that is computed based on the trend in resource usage that is observed over time. The dotted line represents the level of uncertainty in the forecast. The linear forecast may be biased by low usage periods. The seasonal forecast depicted in chart 804 accounts for seasonal factors. The middle plot represents the forecasted values, the upper plot represents the forecast high values in the tolerance interval, and the lower plot represents the forecast low values in the tolerance interval.

Capacity Planning Based on Forecasts

Seasonal forecasting may be used to facilitate capacity planning decisions, according to an embodiment. Underestimating future resource usage may lead to significant decreases in performance if the deployed resources are overloaded. With a separate treatment of sparse highs from dense highs and lows, as previously described, the impact of low usage periods on the forecast may be mitigated, thereby reducing the likelihood that peak resource usage parameters will be underestimated.

In an embodiment, the projected values may be used to plan, recommend, and/or order resources to handle increased resource usage. Different actions and/or recommendations may be set to trigger upon detecting that a projected value or trend exceeds a threshold. As an example, the projected sparse high values may indicate that resource usage will exceed a threshold thereby overloading current resources at a future time. In response, the system may recommend additional hardware and/or software resources to satisfy the projected increase in resource usages.

In another embodiment, the projected values may be used to consolidate resources. For instance, if resource usage is projected to decline past a threshold, then the system may recommend or automatically consolidate hardware and/or software resources to more efficiently utilize these resources and free up resources for other applications.

Based on a seasonal forecast, administrators may determine a variety of characteristics associated with a particular resource or set of resources. For instance, the forecast may indicate whether there is a high risk of exhaustion for the resource, a high risk for exhaustion for batch (sparse) jobs but low risk for typical (dense) workloads, a low risk for exhaustion but increasing trend, a consistent, predictable scheduled load, a decreasing trend in load, etc. In the context of a clustered database that is distributed across multiple hosts, a user may determine if the system or any instance is likely to run out of capacity within the next 30 days (or some other horizon). The user may also determine if the load for two or more applications may be handled by a single database instance.

Hardware Implementations

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 9:
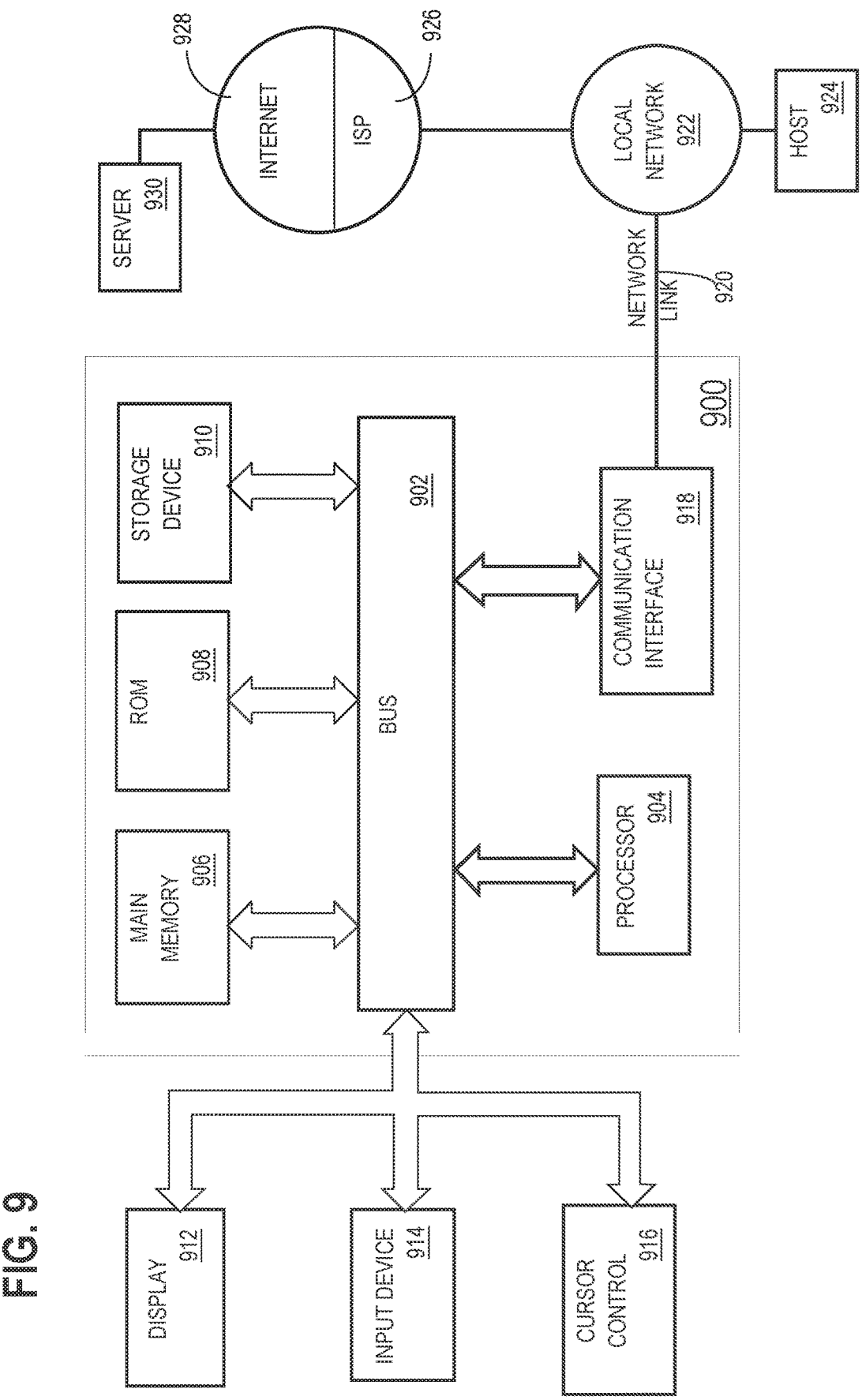
FIG. 9 is a block diagram that illustrates a computer system upon which some embodiments may be implemented.

For example, FIG. 9 is a block diagram that illustrates a computer system 900 upon which an embodiment of the invention may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk, optical disk, or solid-state drive is provided and coupled to bus 902 for storing information and instructions.

Computer system 900 may be coupled via bus 902 to a display 912, such as a liquid-crystal display (LCD) or a light-emitting diode (LED) display, for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks or magnetic disks, such as storage device 910. Volatile media includes dynamic memory, such as main memory 906. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

The term "logic" as used herein includes computer or electrical hardware component(s), firmware, a non-transitory computer readable medium that stores instructions, and/or combinations of these components configured to perform one or more functions or actions, and/or to cause one or more functions or actions from another logic, method, and/or system. Logic may include a microprocessor controlled by executable code, a discreet logic (e.g., ASIC), an analog circuit, a digital circuit, a programmed logic device, a memory device containing instructions that when executed perform an algorithm, and so on. Logic may include one or more gates, combinations of gates, or other circuit components. Where multiple logic units are described, it may be possible to incorporate the multiple logic units into one physical logic component. Similarly, where a single logic unit is described, it may be possible to distribute the single logic unit between multiple physical logic components.

Storage media is distinct from but may be used in conjunction with transmission media. Transmission media participates in transferring information between storage media.

For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid-state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

Cloud Computing Overview

The techniques described herein are implemented using one or more processing solutions, examples of which include distributed systems, clustered computing systems, and cloud computing systems. In an embodiment, one or more logic blocks described above are part of a cloud computing system. A cloud computing system implements one or more of: cloud storage, cloud processing, cloud communication, and any other kind of cloud computing service. Further, cloud computing systems may operate under a pay-for-what-you-use-as-you-use-it model, under a fixed subscription model, etc. In a cloud-based environment, any part (or the whole of) the functionality described above may be controllable via an interface that is exposed at a cloud computing system.

Extensions and Alternatives

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   decomposing a set of time-series data into a noise signal and a dense signal;
   generating, by a machine-learning process, a forecasting model that maps a first set of forecasting components to a first season and a second set of forecasting components to a second season;
   wherein the first set of forecasting components defines a first uncertainty interval for the first season based at least in part on recurring sparse features in the noise signal and the second set of forecasting components defines a second uncertainty interval for the second season based at least in part on recurring dense features in the dense signal;
   storing residuals for the forecasting model separately by context;
   wherein a first set of residuals associated with the recurring sparse features in the noise signal are stored separately from a second set of residuals associated with the recurring dense features in the dense signal;
   wherein the first uncertainty interval is computed as a function of the first set of residuals associated with the recurring sparse features in the noise signal and the second uncertainty intervals is computed as a function of the second set of residuals associated with the recurring dense features in the dense signal;
   generating, based at least in part on the forecasting model, a forecast for at least once computing resource that projects:
   (a) a first range of computing metric values for a first future instance of the first season as a function of the first uncertainty interval; and
   (b) a second range of computing metric values for a second future instance of the second season as a function of the second uncertainty interval; and
   performing at least one operation on at least one computing system based on at least one of the first range of computing metric values or the second range of computing metric values, wherein the at least one operation comprises deploying additional resources to satisfy anticipated demand on the at least one computing system.

2. The method of claim 1, wherein the first uncertainty interval and the second uncertainty interval are tolerance intervals; wherein the first uncertainty interval is computed as a function of a first sampling error and a first variance in values associated with forecasting in the first season and the second uncertainty interval is computed as a function of a second sampling error and a second variance in values associated with forecasting in the second season.

3. The method of claim 1, wherein the first uncertainty interval and the second uncertainty interval are confidence intervals; wherein the first uncertainty interval indicates where a first average value or variance within the first season is expected to fall; wherein the second uncertainty interval indicates where a second average value or variance within the second season is expected to fall.

4. The method of claim 1, wherein the first season corresponds to a sparse seasonal high season and the second season corresponds to a dense seasonal high season.

5. The method of claim 1, wherein the first set of forecasting components further define a first trend rate and a first anchor point for the first season; wherein the second set of forecasting components further define a second trend rate and a second anchor point for the second season.

6. The method of claim 1, wherein generating, by the machine-learning process, the forecasting model comprises: determining the first set of residuals based, at least in part, on differences between observed values in the noise signal associated with the first season in a sample period and projected values associated with the first season in the sample period; and determining a second set of residuals based, at least in part, on differences between observed values in the dense signal associated with the second season in the sample period and projected values associated with the second season in the sample period; modelling, based at least in part on the first set of residuals, the first uncertainty interval; and modelling, based at least in part on the second set of residuals, the second uncertainty interval.

7. The method of claim 1, wherein the first uncertainty interval is wider than the second uncertainty interval to reflect a greater level of uncertainty in projecting computing resource metrics for the computing system during the first season than in the second season.

8. One or more non-transitory computer-readable media storing instructions, wherein the instructions include:
   decomposing a set of time-series data into a noise signal and a dense signal;
   generating, by a machine-learning process, a forecasting model that maps a first set of forecasting components to a first season and a second set of forecasting components to a second season;
   wherein the first set of forecasting components defines a first uncertainty interval for the first season based at least in part on recurring sparse features in the noise signal and the second set of forecasting components defines a second uncertainty interval for the second season based at least in part on recurring dense features in the dense signal;
   storing residuals for the forecasting model separately by context;
   wherein a first set of residuals associated with the recurring sparse features in the noise signal are stored separately from a second set of residuals associated with the recurring dense features in the dense signal;
   wherein the first uncertainty interval is computed as a function of the first set of residuals associated with the recurring sparse features in the noise signal and the second uncertainty intervals is computed as a function of the second set of residuals associated with the recurring dense features in the dense signal;
   generating, based at least in part on the forecasting model, a forecast for at least once computing resource that projects:
      (a) a first range of computing metric values for a first future instance of the first season as a function of the first uncertainty interval; and
      (b) a second range of computing metric values for a second future instance of the second season as a function of the second uncertainty interval; and
   performing at least one operation on at least one computing system based on at least one of the first range of computing metric values or the second range of computing metric values, wherein the at least one operation comprises deploying additional resources to satisfy anticipated demand on the at least one computing system.

9. The media of claim 8, wherein the first uncertainty interval and the second uncertainty interval are tolerance intervals; wherein the first uncertainty interval is computed as a function of a first sampling error and a first variance in values associated with forecasting in the first season and the second uncertainty interval is computed as a function of a second sampling error and a second variance in values associated with forecasting in the second season.

10. The media of claim 8, wherein the first uncertainty interval and the second uncertainty interval are confidence intervals; wherein the first uncertainty interval indicates where a first average value or variance within the first season is expected to fall; wherein the second uncertainty interval indicates where a second average value or variance within the second season is expected to fall.

11. The media of claim 8, wherein the first season corresponds to a sparse seasonal high season and the second season corresponds to a dense seasonal high season.

12. The media of claim 8, wherein the first set of forecasting components further define a first trend rate and a first anchor point for the first season; wherein the second set of forecasting components further define a second trend rate and a second anchor point for the second season.

13. The media of claim 8, wherein generating, by the machine-learning process, the forecasting model comprises: determining the first set of residuals based, at least in part, on differences between observed values in the noise signal associated with the first season in a sample period and projected values associated with the first season in the sample period; and determining a second set of residuals based, at least in part, on differences between observed values in the dense signal associated with the second season in the sample period and projected values associated with the second season in the sample period; modelling, based at least in part on the first set of residuals, the first uncertainty interval; and modelling, based at least in part on the second set of residuals, the second uncertainty interval.

14. The media of claim 8, wherein the first uncertainty interval is wider than the second uncertainty interval to reflect a greater level of uncertainty in projecting computing resource metrics for the computing system during the first season than in the second season.

15. The media of claim 8, wherein the instructions further cause: classifying, by the machine learning process, the first season based on the sparse features that recur in the noise signal and classifying the second season based on the dense features that recur in the dense signal.

16. The media of claim 8, wherein the first uncertainty interval is associated with a sparse high uncertainty value and the second uncertainty interval is associated with a dense high uncertainty value; wherein the first range of computing metric values is determined by adding the sparse high uncertainty value to at least a first value forecasted for a sparse high season and wherein the second range of computing metric values is determined by adding the dense high uncertainty value to at least a second value forecasted for a dense high season.

17. A system comprising:
one or more hardware processors;
one or more non-transitory computer-readable media storing instructions, which when executed by the one or more hardware processors cause:
decomposing a set of time-series data into a noise signal and a dense signal;
generating, by a machine-learning process, a forecasting model that maps a first set of forecasting components to a first season and a second set of forecasting components to a second season;
wherein the first set of forecasting components defines a first uncertainty interval for the first season based at least in part on recurring sparse features in the noise signal and the second set of forecasting components defines a second uncertainty interval for the second season based at least in part on recurring dense features in the dense signal;
storing residuals for the forecasting model separately by context;
wherein a first set of residuals associated with the recurring sparse features in the noise signal are stored separately from a second set of residuals associated with the recurring dense features in the dense signal;
wherein the first uncertainty interval is computed as a function of the first set of residuals associated with the recurring sparse features in the noise signal and the second uncertainty intervals is computed as a function of the second set of residuals associated with the recurring dense features in the dense signal;
generating, based at least in part on the forecasting model, a forecast for at least once computing resource that projects:
(a) a first range of computing metric values for a first future instance of the first season as a function of the first uncertainty interval; and
(b) a second range of computing metric values for a second future instance of the second season as a function of the second uncertainty interval; and
performing at least one operation on at least one computing system based on at least one of the first range of computing metric values or the second range of computing metric values, wherein the at least one operation comprises deploying additional resources to satisfy anticipated demand on the at least one computing system.

18. The system of claim 17, wherein the first uncertainty interval and the second uncertainty interval are tolerance intervals; wherein the first uncertainty interval is computed as a function of a first sampling error and a first variance in values associated with forecasting in the first season and the second uncertainty interval is computed as a function of a second sampling error and a second variance in values associated with forecasting in the second season.

19. The system of claim 17, wherein the first uncertainty interval and the second uncertainty interval are confidence intervals; wherein the first uncertainty interval indicates where a first average value or variance within the first season is expected to fall; wherein the second uncertainty interval indicates where a second average value or variance within the second season is expected to fall.

* * * * *

UNITED STATES PATENT AND TRADEMARK OFFICE
CERTIFICATE OF CORRECTION

PATENT NO. : 11,670,020 B2
APPLICATION NO. : 17/039112
DATED : June 6, 2023
INVENTOR(S) : Garvey et al.

It is certified that error appears in the above-identified patent and that said Letters Patent is hereby corrected as shown below:

In the Specification

In Column 2, Line 16, delete "$F_{t+}k$" and insert -- $F_{t+k}$ --, therefor.

In Column 17, Line 10, delete "$H_{t-1}$" and insert -- $H_{t-i}$ --, therefor.

In Column 17, Line 67, delete "$\overline{s} \pm \lambda s$" and insert -- $\overline{x} \pm \lambda s$ --, therefor.

Signed and Sealed this
Second Day of April, 2024

Katherine Kelly Vidal
*Director of the United States Patent and Trademark Office*